US012483852B1

(12) United States Patent
Starobin et al.

(10) Patent No.: US 12,483,852 B1
(45) Date of Patent: Nov. 25, 2025

(54) SYSTEM AND METHOD FOR ADJUSTING LOUDSPEAKER PERFORMANCE BASED ON LISTENER LOCATION

(71) Applicant: Sound United LLC, Carlsbad, CA (US)

(72) Inventors: Bradley M. Starobin, Baltimore, MD (US); Matthew Lyons, York, PA (US); John Crisco, Ellicott City, MD (US); Frank Starobin, Carlsbad, CA (US)

(73) Assignee: SOUND UNITED LLC, Carlsbad, CA (US)

( * ) Notice: Subject to any disclaimer, the term of this patent is extended or adjusted under 35 U.S.C. 154(b) by 407 days.

(21) Appl. No.: 17/933,661

(22) Filed: Sep. 20, 2022

Related U.S. Application Data

(60) Provisional application No. 63/305,055, filed on Jan. 31, 2022, provisional application No. 63/245,987, filed on Sep. 20, 2021.

(51) Int. Cl.
*H04S 7/00* (2006.01)

(52) U.S. Cl.
CPC .............. *H04S 7/303* (2013.01); *H04S 7/307* (2013.01); *H04S 2400/01* (2013.01); *H04S 2400/13* (2013.01)

(58) Field of Classification Search
CPC ...... H04S 7/303; H04S 7/307; H04S 2400/01; H04S 2400/13
USPC .......................................................... 381/300
See application file for complete search history.

(56) References Cited

U.S. PATENT DOCUMENTS

| | | | |
|---|---|---|---|
| 4,489,432 | A | 12/1984 | Polk |
| 4,497,064 | A | 1/1985 | Polk |
| 4,569,074 | A | 2/1986 | Polk |
| 4,594,729 | A | 6/1986 | Weingartner |
| 4,638,505 | A | 1/1987 | Polk et al. |
| 4,759,066 | A | 7/1988 | Polk et al. |
| 4,888,804 | A | 12/1989 | Gefvert |
| 5,553,149 | A | 9/1996 | Freadman |

(Continued)

OTHER PUBLICATIONS

Tortosa, et al: "Acoustic Positioning System for 3D Localization of Sound Sources Based on the Time of Arrival of a Signal for a Low-Cost System" Engineering Proceedings; Eng. Proc. 2021, 10, 15. https://doi.org/10.3390/ecsa-8-11307; Multidisciplinary Digital Publishing Institute; Nov. 1, 2021.

(Continued)

*Primary Examiner* — Carolyn R Edwards
*Assistant Examiner* — Friedrich Fahnert
(74) *Attorney, Agent, or Firm* — Nieves IP Law Group, LLC; Peter A. Nieves

(57) ABSTRACT

A method for adjusting loudspeaker performance is based on a location of a listener of an audio system rendering a plurality of audio channels of an audio program within a listening environment. Data is received indicative of a location of the listener in the listening environment with respect to a first loudspeaker receiving a first audio channel and a second loudspeaker receiving a second audio channel. A time delay parameter value is determined for the first audio channel based on the listener location with respect to the first loudspeaker and a second loudspeaker. An audio level parameter value is adjusted for the first audio channel and/or the second audio channel based on the listener location.

11 Claims, 13 Drawing Sheets

(56) References Cited

U.S. PATENT DOCUMENTS

| | | | | |
|---|---|---|---|---|
| 6,490,359 | B1 | 12/2002 | Gibson | |
| 6,937,737 | B2 | 8/2005 | Polk, Jr. | |
| 7,231,053 | B2 | 6/2007 | Polk, Jr. | |
| 7,817,812 | B2 | 10/2010 | Polk, Jr. et al. | |
| 9,185,490 | B2 | 11/2015 | Starobin | |
| 9,226,091 | B2 | 12/2015 | Lyons et al. | |
| 9,374,640 | B2 | 6/2016 | Starobin | |
| 10,070,244 | B1 * | 9/2018 | Dabney | H04R 5/04 |
| 10,327,064 | B2 | 6/2019 | Starobin | |
| 10,327,086 | B2 | 6/2019 | Orth et al. | |
| 11,937,066 | B2 | 3/2024 | Starobin et al. | |
| 12,120,494 | B2 | 10/2024 | Orth | |
| 2006/0170778 | A1 | 8/2006 | Ely et al. | |
| 2009/0123007 | A1 * | 5/2009 | Katayama | H04S 7/302 381/300 |
| 2009/0175476 | A1 | 7/2009 | Bottum | |
| 2011/0216925 | A1 | 9/2011 | Riggs et al. | |
| 2015/0016642 | A1 * | 1/2015 | Walsh | H04S 7/301 381/307 |
| 2016/0149547 | A1 | 5/2016 | Rider et al. | |
| 2016/0286167 | A1 | 9/2016 | Clavel et al. | |
| 2020/0221240 | A1 | 7/2020 | Pye et al. | |
| 2020/0401369 | A1 | 12/2020 | Sabin et al. | |

OTHER PUBLICATIONS

Extended European Search Report for EP 22750290.3, dated Nov. 13, 2024.

* cited by examiner

SYSTEM AND METHOD FOR ADJUSTING LOUDSPEAKER PERFORMANCE BASED ON LISTENER LOCATION

CROSS-REFERENCE TO RELATED APPLICATIONS

This application claims the benefit of U.S. Provisional Patent Application Ser. No. 63/245,987, filed Sep. 20, 2021, entitled "Audio Profiles for Providing Enhanced Rendering of Streaming Video Content," and U.S. Provisional Patent Application Ser. No. 63/305,055, filed Jan. 31, 2022, entitled "Method for Implementing Stereo Dimensional Array Sound Projections from novel Transducer Array, Signal Processing Method and Compact Single Enclosure Active Loudspeaker System," each of which is incorporated by reference herein in its entirety.

FIELD OF THE INVENTION

The present invention relates to electronic audio reproduction, and more particularly, is related to adjusting loudspeaker performance based on listener location.

BACKGROUND OF THE INVENTION

Certain aspects of audio playback are linked to room acoustics and the location of a listener relative to the loudspeakers. Acoustic imaging has critical dependencies on a listener location relative to the loudspeakers, both temporal (time domain) and spectral (frequency domain). Furthermore, the loudspeakers' relative sound levels greatly affect acoustic imaging for the listener. It has been well established that for pairs of conventional loudspeakers (110L, 110R (FIG. 1), in the absence of any compensatory sound processing, there exists a "sweet spot" S that ideally corresponds with a location L for the listener 120 (FIG. 1) between the speakers 110L, 110R such that the listener 120 and the speakers 110L, 110R substantially form an isosceles triangle, as shown in FIG. 1. As a location L of the listener 120 moves away from the optimal location S off a listening-axis axis 150, as shown by FIG. 2, the listener 120 may be situated more proximately to one loudspeaker 110L and further from the other loudspeaker 120R, which generally results in both higher sound pressure levels (SPL) from the more proximate speaker 110L and, temporally, ensuring that the direct sound of the proximate speaker 110L reaches the listener before the distal speaker 110R. These level and timing issues cause the acoustic image to gravitate towards the more proximate (and louder) speaker 110L. Furthermore, as the listener 120 moves to locations progressively further off-axis with respect to each loudspeaker's preferred, main radiation axis, the listener's perceived acoustic response increasingly deviates from the preferred on-axis response in accordance with speaker polar radiation patterns, especially within the upper portion of the loudspeaker's passband due to the inherent higher directivity of conventional electrodynamic loudspeaker transducers as acoustic wavelengths approach their characteristic diaphragm (dome) dimensions. Therefore, there is a need in the industry to address one or more of the abovementioned issues.

SUMMARY OF THE INVENTION

Embodiments of the present invention provide a system and method for adjusting loudspeaker performance based on listener location. Briefly described, a first aspect of the present invention is directed to a system and method for adjusting loudspeaker performance based on a location of a listener of an audio system rendering a plurality of audio channels of an audio program within a listening environment. Data is received indicative of a location of the listener in the listening environment with respect to a first loudspeaker receiving a first audio channel and a second loudspeaker receiving a second audio channel. A time delay parameter value is determined for the first audio channel based on the listener location with respect to the first loudspeaker and a second loudspeaker. An audio level parameter value is adjusted for the first audio channel and/or the second audio channel based on the listener location.

A second aspect of the present invention is directed to a method and system for locating a listener with respect to loudspeakers of an audio system.

A third aspect of the present invention is directed to a method for adjusting loudspeaker performance based on a location of two or more of a plurality of listeners of an audio system rendering a plurality of audio channels of an audio program within a listening environment.

A fourth aspect of the present invention is directed to a method for adjusting parameters for rendering by one or more loudspeakers based on the listener location to compensate for perceived loudness.

A fifth aspect of the present invention is directed to a method for adjusting parameters for rendering by two or more loudspeakers to adjust interaural crosstalk cancellation based on the listener location.

A sixth aspect of the present invention is directed to a method and system for locating relative locations of loudspeakers of an audio system based on their audio emissions and reception by microphones embedded within the loudspeakers.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Figure 2:
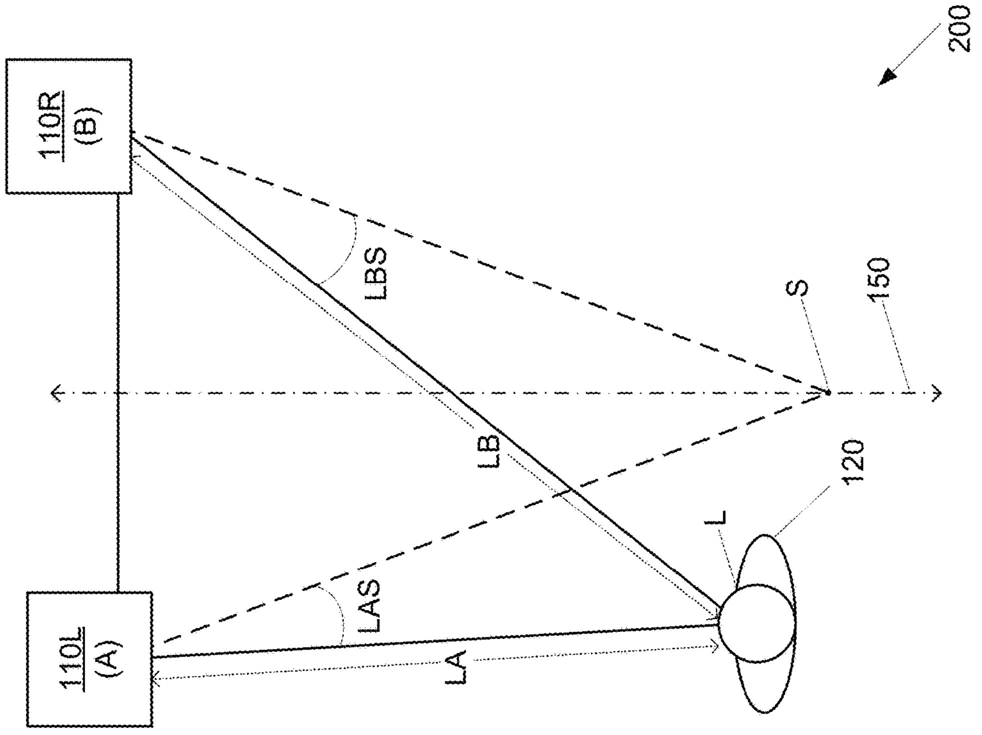
FIG. 2 is a schematic diagram of the audio system of FIG. 1 where the listener is no longer situated at the sweet spot.

The following definitions are useful for interpreting terms applied to features of the embodiments disclosed herein, and are meant only to define elements within the disclosure.

As used within this disclosure, an "audio signal" generally refers to an analog signal or a digital signal (digitally encoded audio data) configured to convey a plurality of audio channels for rendering via an audio rendering system. The audio signal may be conveyed via a wired (for example, multiple wires or multiplexed copper wires or optical fibers) or wireless (for example, WiFi, BlueTooth, Zigbee, among others) connection.

As used within this disclosure, adjusting a "parameter value for a loudspeaker" generally refers to an adjustable parameter (for example, in time, frequency, or amplitude) of an audio signal to be routed directly or indirectly to a loudspeaker. This generally does not refer to adjusting a physical property of the loudspeaker itself.

As used within this disclosure, a listener "center of gravity" refers to a location between/amongst two or more listeners within a plane of a listening environment, for example, in a plane of loudspeaker transducers of the listening environment (which ideally would correspond to the listener ear height).

As used within this disclosure, an "active loudspeaker" refers to a powered speaker enclosure containing one or more audio transducers (loudspeakers) along with a powered component, such as an amplifier, crossover, audio processor, or the like, that receives a low amplitude ("line level") audio input signal, either wired or wirelessly, as input and produces a higher amplitude audio signal ("speaker level") as output to the transducers. In contrast, a passive loudspeaker does not require a power source and receives a wired speaker level audio signal as input.

As used within this disclosure, an "audio level parameter" refers to a parameter configured to adjust the perceived amplitude (volume level) of an audio program at a listener location.

As used within this disclosure, a "center axis of a listening environment" refers to an imaginary line drawn between left and right loudspeakers of a loudspeaker pair, for example, a stereo pair. Theoretically, the stereo image of a loudspeaker pair is best perceived by a listener positioned along the center axis. An "off-axis" listener location refers to a listener location to the left or the right of the center axis.

As used within this disclosure, "ISO 226" refers to a family of equal-loudness curves (contours) that indicate sound pressure level over the frequency spectrum, for which a listener perceives a constant loudness when presented with pure steady tones. These curves are defined in ISO 226 from the International Organization for Standardization.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention provide a high-quality audio experience based on a detected listener location with respect to loudspeakers 110 in an audio system.

Figure 3:
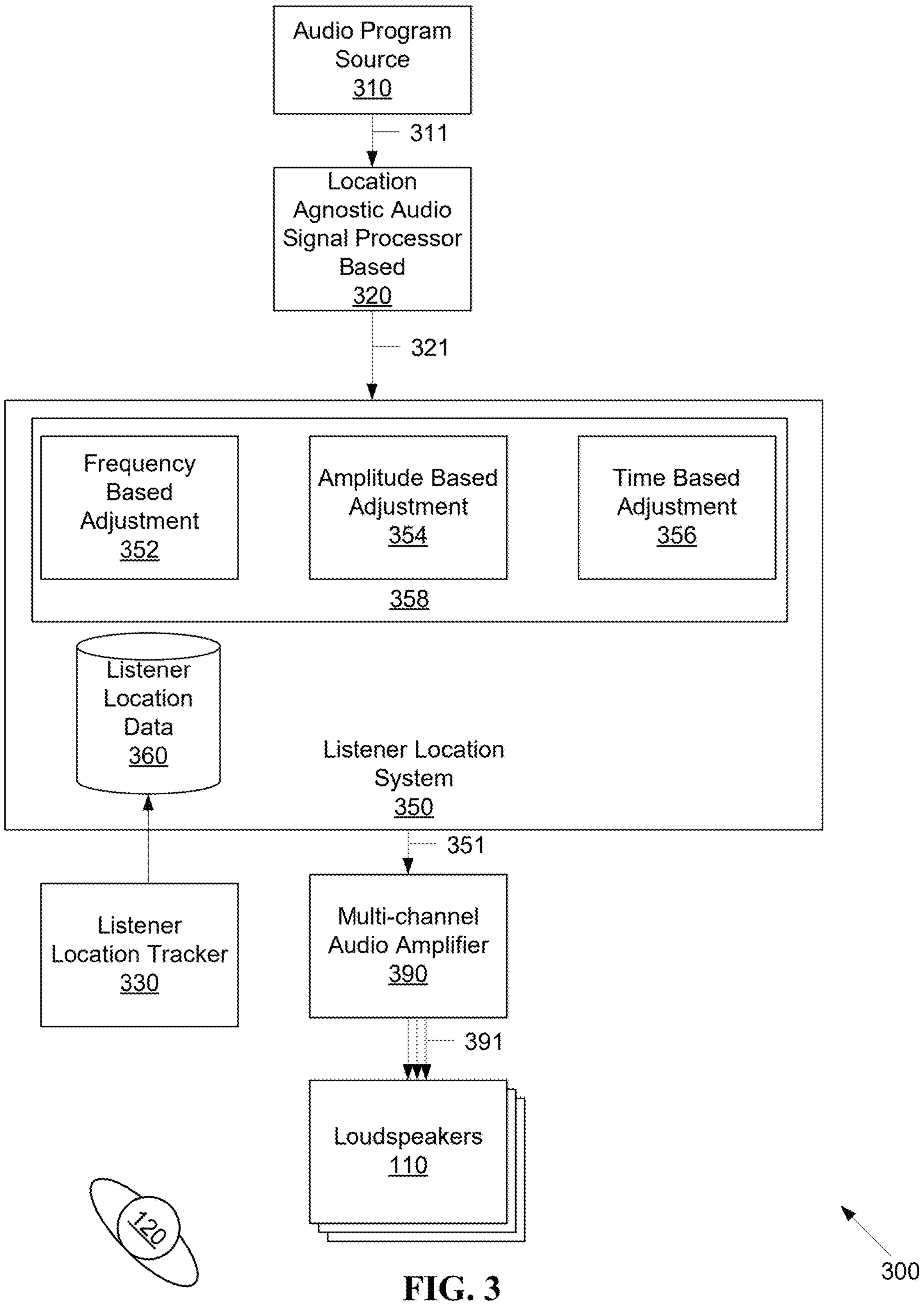
FIG. 3 is schematic block diagram of a first embodiment system for adjusting loudspeaker performance based on user location in a multi-loudspeaker system.

FIG. 3 shows a first embodiment system 300 for adjusting performance of a plurality of loudspeakers based on location of a listener. The system 300 has an audio program source 310, for example, an audio or audio/video streaming service, a television, a cable box, an optical disc player, and the like. The audio program source provides audio data 311 (for example, digital data or an analog signal) to an audio processor 320 configured to accept analog audio or digital audio, for example, an audio pre-amplifier providing traditional audio processing controls such as audio channel balance, volume, equalization (bass/middle/treble), and the like. While conventional audio components, such as an audio/video receiver (AVR) do afford such processing controls, control settings are preferably to be set to "default" values under the present embodiments. The audio processor 320 may be generally unaware of the physical location of a listener of the system 300 with respect to a plurality of loudspeakers 110. The audio processor 320 may output an analog audio and/or a digital audio signal 321. Furthermore, the audio processor 320 may be embedded within one of the loudspeakers which serves as a "hub" control center for the system.

A listener location system 350 receives the audio signal output 321 from the audio processor 320, and provides a modified audio signal 351 to a multi-channel amplifier 390. The listener location system 350 includes a listener location based signal processor 358, and a listener location data store 360. The listener data location store 360 contains listener location data indicating the location of a listener 120 with respect to the loudspeakers 110. The listener data location store 360 receives listener location data from a listener location tracker 330, described further below.

It should be noted that while FIG. 3 depicts the multi-channel audio amplifier 390 providing amplified channels 391 to loudspeakers 110, in alternative configurations the listener location may provide wired or wireless channel data to a powered loudspeaker, where a single loudspeaker enclosure may incorporate a plurality of audio components, such as transducers (drivers), audio amplifiers, and/or crossovers. Similarly, while FIG. 3 depicts a single listener location tracker 330, alternative embodiments may incorporate two or more listener location trackers, for example, positioned in various locations of the listening environment, or incorporated into the loudspeakers 110.

Figure 1:
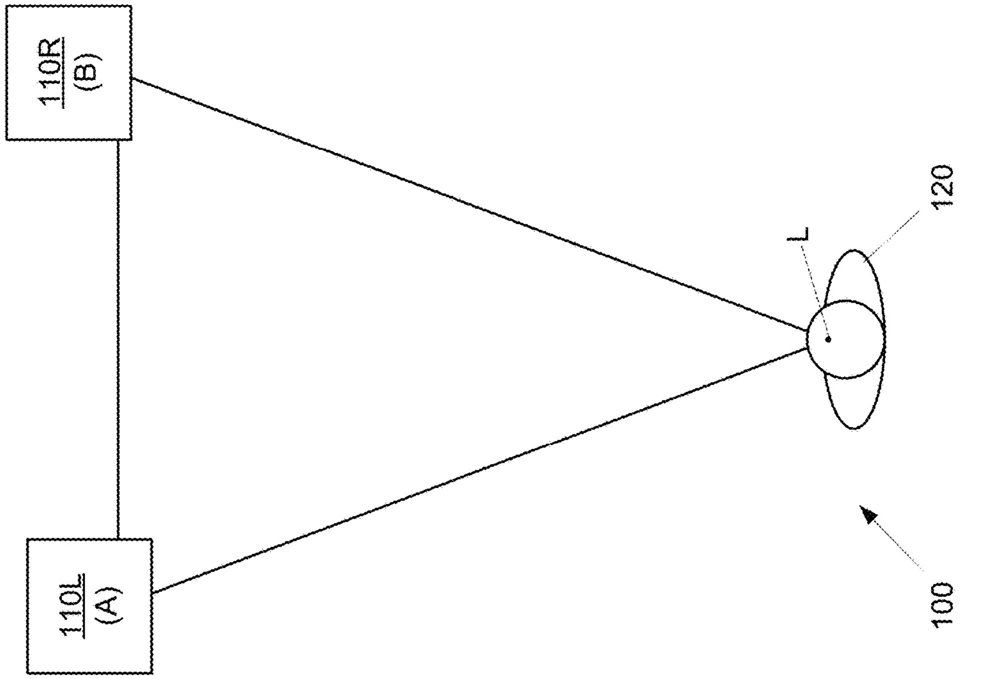
FIG. 1 is a schematic diagram showing an exemplary audio system with a listener occupying a "sweet spot", equidistant from two loudspeakers.

One exemplary, practical means of locating the listener within the media space involves the use of Bluetooth LE (BT LE). With reference to FIGS. 1 and 2, loudspeaker A 110L may be regarded as the origin of a coordinate plane. An array of BT LE receivers may be integrated within loudspeaker A 110L. The BT LE array receivers are together capable of detecting both distance and direction of BT LE sources within the space. The listener L emits BT LE signals by means of a BT LE source, for example, integrated into the hand-held remote control, fastened to the clothing of the listener L, or by some other means. Similarly, loudspeaker B 110R may also transmit BT LE signals which are received by the BT LE receiving array of loudspeaker A 110L which computes both distance and relative location on the basis of these received transmissions. In this manner, the location of both speaker B 110R and the listener 120 may be established and recorded for computation purposes as (x,y) coordinates.

Method for Determining Relative Loudspeaker Distance

An alternative embodiment of the present invention is directed to determining the distance of a first loudspeaker relative to a second and/or third loudspeaker using audio signals. The loudspeaker relative distance method may involve a single microphone or multi-element microphone arrays on each loudspeaker. The method may be used to determine the distances between two or more loudspeakers. The loudspeakers sequentially emit test tones, the origin (location) of which are determinable via processing the microphone signals. In a first variation embodiment, only one omni-directional microphone is surface mounted to each loudspeaker enclosure. At least two speakers exclusive of a "target" loudspeaker whose location is being determined would together serve as an array for locating one of the other speakers. In this embodiment a third or fourth speaker may be included within the microphone (speaker) array for improved accuracy. In a second variation, a multi-element array (minimum of two microphones) may be mounted to at least one speaker; then only one speaker is needed for locating the other speakers in the system in accordance with established microphone array processing methods while the other speakers' microphones may be used for improved precision.

A third variation, which may be regarded as a hybrid of the first two, involves a single microphone on each speaker with the exception of the center channel which would incorporate a multi-element array of two or more microphones. The center channel speaker, by virtue of its multi-element microphone array, is capable of determining the location of all of the other speakers. The location of the center speaker itself, presumably directly in front of and quite near a video monitor, may be regarded as the origin of the (x,y) coordinate plane used to map the loudspeaker system. In the previous three variations, processing hardware may be embedded within at least one of the loudspeakers.

A fourth variation places the signal transmission and processing "hub" in a dedicated console, separate from any of the loudspeakers. In this embodiment, the console may house the signal processing "brains" and receive location data, whether derived from BT LE transmissions or from microphone array data, and determine the compensatory digital signal processing (DSP) settings (described herein) in accordance with achieving optimal performance for the listener at their known location. It shall be noted here that the fourth alternative embodiment is not mutually exclusive with respect to any other embodiment and that skilled practitioners will conceive of various permutations of the embodiments specified herein. Any and all of them shall be within the scope of the present invention. As described further herein, compensatory loudspeaker parameters may be computed and applied dynamically. It should be noted the embodiments are not limited by the specific means for locating the listener with respect to the loudspeakers.

Besides using a BLE transceiver or a single microphone or a multi-element microphone array incorporated in the system remote control, for example, there are other ways to determine the primary listening location within the media space. In any system in which the loudspeakers include surface-mounted microphones (single or in arrays), the listener may be located by prompting him to speak or clap as a means of emitting an aural location cue that will be received by the various microphones when the system's "listening mode" is invoked. In accordance with established microphone array processing techniques such as triangulation, the listening location may be established in this manner, obviating the need for a BLE or other transmit/receive (transceiver) system or any microphones included in the system remote control.

A two microphone array, for example as shown by FIG. 1 consisting of a pair of omnidirectional microphones surface-mounted to the left loudspeaker 110L and right loudspeakers 110L (one microphone to each speaker) is sufficient for establishing the (x,y) coordinates of the listener 120. Note that a third receiver (microphone) would be required to determine the z-coordinate (height) of the listener's location. Even if the listener location's z-coordinate does not need to be determined, additional microphones (receivers) can greatly improve accuracy. Preferably, three or more microphones may be used in order to establish the (x,y) coordinates associated with the listener's location 120. Systems such as this in which the source, the listener's emitted aural cue, is not controlled or triggered by the acquisition system itself are sometimes referred to as "asynchronous transmitter-receiver systems." In accordance with the scientific paper "Acoustic Positioning System for 3D Localization of Sound Sources by Totosa, Herrero-Dura and Otero (copyright 2021) published by MDPI (Multidisciplinary Digital Publishing Institute), a solvable system of nonlinear equations for the distance between the listener ("Emitter") and each receiver (microphone) whose locations are known may be established. As described further below, solving this system of equations yields the listener's location in terms of his (x,y) coordinates.

Figure 8:
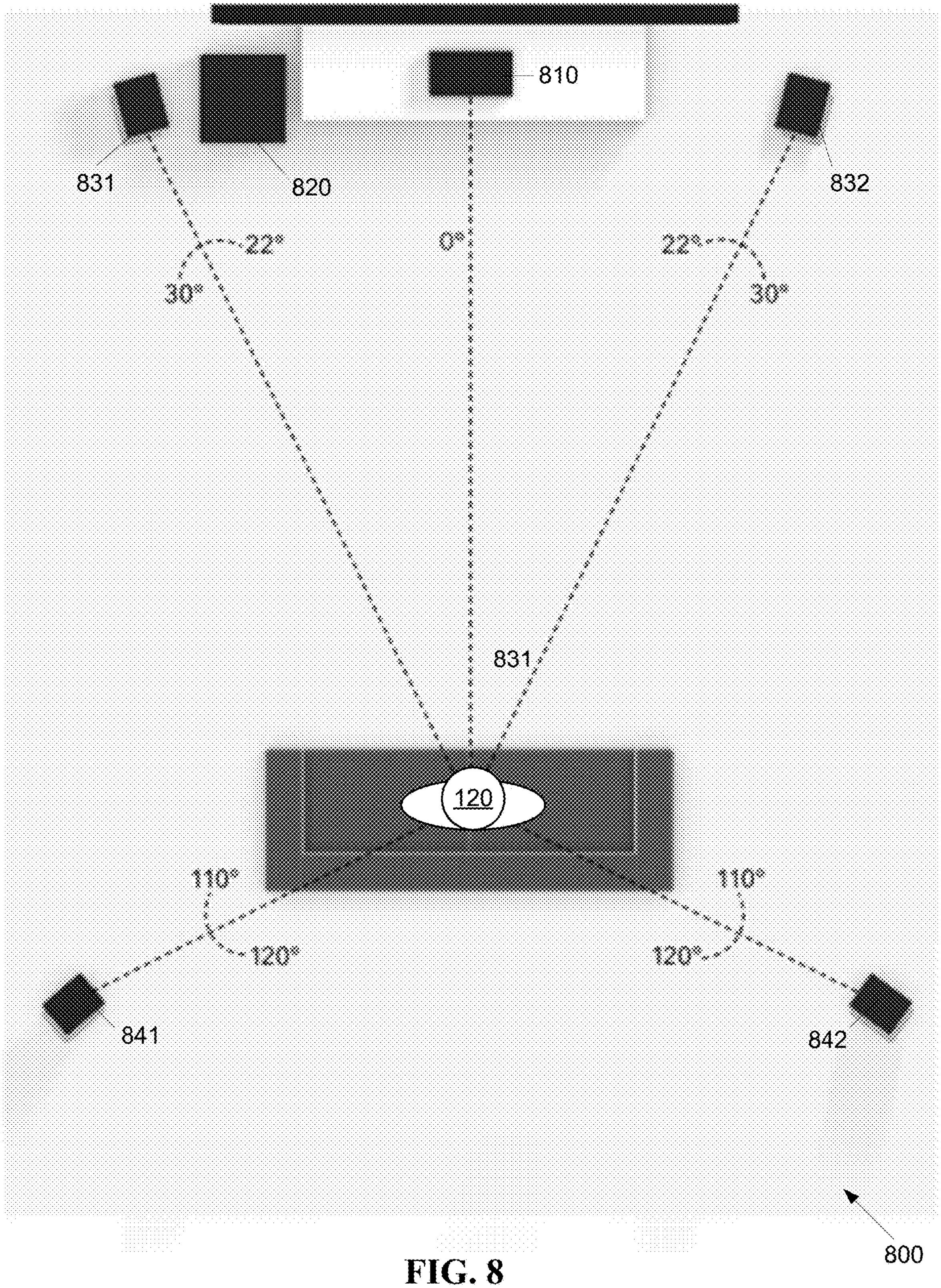
FIG. 8 is a schematic diagram illustrating a listening environment with a 5.1.0 channel loudspeaker arrangement.

An exemplary process embodiment for determining loudspeaker location using speaker emitted aural cues and loudspeaker embedded microphones (surface mount omnidirectional) is described here with reference to FIG. 8. In this example, the audio system includes six loudspeakers. It should be noted that in other examples there may be three, four, five, seven, or more loudspeakers, each of which includes a surface mounted omnidirectional microphone on the front, side, top or rear face of the speaker enclosure. Here, the speakers include front left (FL) 831, front right (FL) 832, center (C) 810, surround left (SL) 841, surround right (SR) 842, and a subwoofer (Sub) 820.

The exemplary process for locating FL 831 is as follows:

1. Initiate a "speaker location" mode to prepare FL 831, C 810, FR 832, and SR 842.
2. FL 831 emits test noise, for example, but not limited to a sine-sweep, a wide-band noise burst, among others, while, simultaneously, the microphones of C 810, FR 832 and SL 842 acquire the test noise emitted by FL 831.
   a. The test noise emission occurs at a time referred to here as "time zero" for determining T810, T832 and T842, respectively the travel (propagation) time duration of the emitted test signal's initial impulse reaching loudspeakers (microphone/receivers) C 810, FR 832 and SL 842.

3. C 810 FR832 and SR842 receive the acoustic emission from FL 831 and their associated sound travel times are recorded.
4. The distance from FL 831 (source) to each receiver C 810, FR 832 and SR 842 may be computed by the distance formula Di=cTi in which c is the speed of sound in air under normal indoor conditions (343 m/s), Di is the distance between FL 831 and speaker i and Ti is the sound propagation time associated with source 831 and receiver i (where i=C 810, FR 832, SR 842).
5. FL 831 may be located via trilateration or triangulation techniques.
   a. The coordinates of FL 831 are coincident with the intersection of each of three circles centered at the receivers C 810, FR 832, and SR 842 of radii D810/831, D832/831 and D842/831 where Di/j is the distance between receiver i and source j.
   b. When more than two receivers are used for locating FL 831, the coordinates of FL 831 may be estimated by averaging those generated by each pair of receivers. In this example, receiver pairs 810/832, 810/842 and 832/842 each generate estimates for 831's coordinates. 831's estimated coordinates x^, y^ may be expressed as $x\hat{}=(x_{810/832}+x_{810/842}+x_{832/842})/3$ and likewise $y\hat{}=(y_{810/832}+y_{810/842}+y_{832/842})/3$.

Similarly, C 810's location may be determined by using 831, 832 and 842 as receivers. Generally, any three (minimally two) speakers may be used as receivers for locating another loudspeaker within the loudspeaker system.

An exemplary process for determining loudspeaker location using speaker emitted aural cues and a loudspeaker embedded multi-element microphone array (surface mount omnidirectional) is described here.

Assume the system has six loudspeakers (where a minimum of three is required, one of which is the center channel), one of which (preferably the center channel) includes a surface mounted multi-element omnidirectional microphone array on the front, side, top or rear face of the enclosure.

With reference to FIG. 8, the FL/C/FR/SL/SR/Subwoofer speakers are 831/810/832/841/842/820 respectively.

Here, C 810 (the center channel in this system) houses the microphone array.

Standard array processing methods, including but not limited to TDOA (time difference of arrival) may be employed for determining the location of the loudspeakers. An exemplary process for locating speaker 831 is as follows:

1. Initiate "speaker location" mode which prepares 831 and 810, for this procedure
2. 831 emits a test noise (sine-sweep, wide-band noise burst, etc.) while 810 acquires the test noise emitted by 831.
   a. The test noise emission occurs at a reference "time zero" for determining T810*i*, the travel time duration of the emitted test signal's initial impulse reaching each of 810's microphone array elements i (i=1, 2, 3 . . . n).
3. 810's microphone n array elements receive acoustic emission from 831 and their associated sound travel times are recorded
4. Using the time-difference of arrival (TDOA) method or other standard microphone array processing algorithms, source 831 may be located.
   a. In accordance with the TDOA method, the angle θ between the baseline of the array elements and the incident sound (in degrees) is given by $\theta=\cos^{-1}[(c*\Delta t)/s]$ where c is the speed of sound in air under normal indoor conditions (c=343 m/s) and s is the spacing in meters between array elements.
   b. Once θ has been determined, defining source 831's coordinates includes computing 831's distance from each array element. D810/831 is the product of the speed of sound c and T810/831, the time elapsed between 831's emission (time zero) and the arrival of its impulse at the array elements.
   c. 831's coordinates are fully determined by angle θ and D810/831, the computed distance between center channel speaker/receiver 810 and loudspeaker 831.
5. Likewise, the other loudspeakers' locations may be determined in this manner.
6. Loudspeaker 810, the center channel in the system, may be located quite near (above or below) and substantially centered with respect to the video monitor in a home theater system. As such, it may be convenient to treat C10's location as the reference origin of the Cartesian plane that maps the loudspeakers within the media space.

An exemplary process is described for determining a location of a listener 120 ("sweet spot") using listener emitted aural cues and either (a) multiple loudspeakers embedded with single omnidirectional microphones, or (b) a single loudspeaker (preferably the center channel C 810) having a surface where a multi-element microphone array is mounted. The exemplary process (a) follows:

1. Assume the system includes six loudspeakers (minimum of two required), whose locations, in terms of their (x,y) coordinates, have already been determined.
2. The listener 120 is prompted to emit an aural location cue, such as speaking (saying "here!", for example) or clapping hands, among other possible aural location cues.
3. The microphone enabled loudspeakers, each in a "listen" mode, capture the aural location cue.
4. Time of arrival (ToA) differences are computed for each of the receivers by any valid means including, but not limited to, time domain threshold techniques.
5. A system of equations is set up consisting of one pair of equations for each pair of receivers; for example, when three receivers (A, B and C) are used, there will be three sets of equations corresponding to receiver pairs AB, AC and BC.
6. Each set of equations is solved, yielding estimates of the listener's coordinates ($x_{AB}\hat{}$, $y_{AB}\hat{}$), ($x_{AC}\hat{}$, $y_{AC}\hat{}$), and ($x_{BC}\hat{}$, $y_{BC}\hat{}$) corresponding to each pair of receivers.
7. The listener's estimated location x^,y^ may be determined by the simple average of the estimates associated with each receiver pair (i.e., $x\hat{}=(x_{AC}\hat{}+x_{AC}\hat{}+x_{BC}\hat{})/3]$ and likewise for y^.

For an alternative embodiment (b) for a single loudspeaker (or console), preferably the center channel, with a surface mounted multiple-element omnidirectional microphone array is used for locating the listener and the other loudspeakers in the system, the processes by which the listener's estimated location may be determined in accordance with the steps outlined above except that the receivers are array elements mounted to a single loudspeaker (or console) instead of single microphones surface-mounted to multiple loudspeakers.

An alternative to the asynchronous method of locating the listener relative to loudspeakers (described herein) includes a single microphone or microphone arrays. This alternative embodiment relies on the use of a remote control or other device that emits an audio chirp from the listener location L 120 in coordination with the processing software and loudspeaker system. In this manner, in contrast to the asynchronous method which involves an audio emission initiated at an unknown "time zero", the audio chirp is emitted, when triggered by the processing system, by the remote control/device and a system processor may establish time zero (indicating the time the chirp was emitted), which permits efficient and accurate computation of the listener's location relative to the loudspeakers, whose locations have already been established by one of the other means described herein. An equivalent arrangement where the remote control/device has a microphone to detect and record the time of an audio chirp generated by one or more loudspeakers is also possible.

Adjusting Audio Parameters based on Listener Location

Returning to FIG. 3, the listener location-based signal processor 358 accesses the listener location data 360 and adjusts various parameters of the received audio signal 321 according to the present listener location. For example, the location-based signal processor 358 may make frequency based adjustments with a frequency based adjustment module 352, amplitude based adjustments with an amplitude based adjustment module 354, and time based adjustments with a time based adjustment module 356, among other possible adjustments. A description of the adjustments made by the audio parameter adjustment modules 352, 354, 356 is provided below.

The listener location tracker 330 monitors the location of the listener 120 with respect to the loudspeakers 110 and updates the listener location data in the listener data location store 360. The listener data location store 360 may be updated periodically, for example, in a range between 10 times per second and every 10 seconds or longer (for example intervals such once per every minute may). Alternatively, the listener location tracker 330 may not periodically update the listener location data store 360, but instead only update the listener location data store 360 when the listener location tracker 330 detects a change in the location of the listener 120.

The listener location tracker 330 detects a location of a listener with respect to two or more loudspeakers 110 of the audio rendering system 300. The detection may be one of several known techniques, for example, via sensors attached to or embedded within each of the loudspeakers 110, such as temperature sensors or motion sensors, light based sensors, for example using Lidar (light detection and ranging) technology, microphone arrays, among others. Alternatively, the listener location tracker 330 may track the location of a handheld remote control for the system 300, or may track an electronic device on the person of the listener, for example, a smart phone, or a smart watch. Other location techniques include optical tracking and wireless tracking via anchors placed around the perimeter of the listening environment (sometimes called "indoor GPS" (global positioning system)), for example, as used in some virtual reality (VR) systems.

While the first embodiment 300 in FIG. 3 depicts the listener location based processor 350 apart from the audio processor 320, in a second embodiment, the listener location based processor 350 may be incorporated within the audio processor 320.

The following is an example of how the audio parameter adjustment modules 352, 354, 356 (FIG. 3) adjust audio parameters for a stereo pair of speakers, with reference to FIG. 2. As shown by FIG. 2 the location L of the listener 120 is closer to A, the location of speaker 110L, than B, the location of speaker 110R. The parameter adjustments are based on the location L of the listener relative to the positions A and B of the loudspeakers 110L, 110R. Specifically, the adjustments are made based on both the distance and angle relative to the primary radiating axes of the loudspeakers 110L, 110R. The distance between the listener location L and the left loudspeaker 110L is denoted as LA, while the distance between the lister location R and the right loudspeaker 110R is denoted as LB. The current description is for distances LA, LB where LA is less than LB and angles LAS and LBS which subtend the actual listener location L and the virtual sweet spot location S for speakers (vertices A and B).

When the location L of the listener 120 is closer to a first speaker 110L than a second speaker 110R, the sound traveling from the first speaker 110L reaches the listener 120 before the sound originating from the second speaker 110R. In order to correct for the non-synchronous time of arrival at the listening location, the time-based adjustment module 356 may apply an appropriate delay to the more proximate speaker (110L here) such that its virtual (perceived) location is the same distance from the listener as the actual location of the other (more distant) loudspeaker (110R here). Hence, their acoustic output will reach the listener simultaneously or "in synch." Here, the time-based adjustment may be determined according to Eq. 1:

$$\text{Delay(ms)}=[(LB-LA)/c]*1000 \quad \text{(Eq. 1)}$$

where LB and LA are respectively the distances between listener L and speakers B and A (in meters), and c is the speed of sound in air (343 m/s @20deg. C.). For example, if LA=1 m and LB=3 m, the time delay applicable to speaker A to compensate for the 2 m difference in proximity is $$(2.0/343)\times 1000=5.8\text{ ms} \quad \text{(Eq. 2).}$$

Due to the nature of sound levels as a function of the distance between source and receiver, when the listener 120 is closer to a first speaker 110L than to a second speaker 110R, the sound level from the first speaker 110L is greater (perceived to be louder by listener L, 120) in comparison to the sound from the second speaker 110R. In the simplest case to compensate for the sound level discrepancies, the system 300 may attenuate the first speaker level 110L such that its Sound Pressure Level (SPL) is equal to the 110R's, the second speaker's SPL at the actual listening location L. Here, the amplitude based adjustment module 354 may attenuate the signal level (amplitude) for the more proximate speaker (110L here) such that its perceived volume (SPL) of the audio program matches the level from the other (more distant) loudspeaker (110R here). As explained further below, the level of the more distant loudspeaker may also be adjusted.

The relationship between relative SPL and a receiver's distance from a monopolar source is well understood. Acoustic output falls by 6 dB for every doubling of distance relative to a reference location. A first order approximation is shown in Eq. 3:

$$\text{delta } SPL=6*\log 2(LA/LB) \quad \text{(Eq. 3)}$$

For example, again when LA=1 m and LB=3 m, then $$\text{delta SPL}=6*\log 2(1/3)=6*(-1.585)=-9.5\text{ dB} \quad \text{(Eq. 4)}$$

This means that the more proximate speaker should be attenuated by 9.5 dB when the further speaker is 3 times further away in order to present equal SPL from each speaker at the listening location.

Merely attenuating the more proximate source (A) while leaving the further speaker's (B's) level unaffected in order to achieve the required SPL delta for equal inter-channel levels from speakers A and B at the listening location will result in an overall reduction in sound levels. In order to maintain the overall SPL for the listener, the amplitude-based adjustment module 354 attenuates the nearer speaker 110L by one-half of the computed SPL delta and increases the signal level (gain) of the far speaker 110R by the same dB amount. To continue with this example in which the ratio of AL:BL=1:3, the amplitude-based adjustment module 354 attenuates speaker A by approximately 4.75 dB and increases the gain of speaker B by the same amount.

Other location-based adjustments are also possible. For example, the frequency-based adjustment module 352 may apply equalization curves to one or more audio channels based on the radiation axes of the speakers 110L and 110R relative to the listener 120. For example, adjustments to the equalization curve may involve attenuating/boosting different portions of the audio spectrum based upon the location of the listener 120 relative to the speakers.

While the above examples describe adjusting parameters with respect to an audio system with two loudspeakers (stereo left/right pair), the adjustments may be extended for audio systems with three, four, or more loudspeakers, including combinations of paired speakers (front, back, and side pairs) and singular speakers (for example, subwoofer or center channel speakers).

Figure 4:
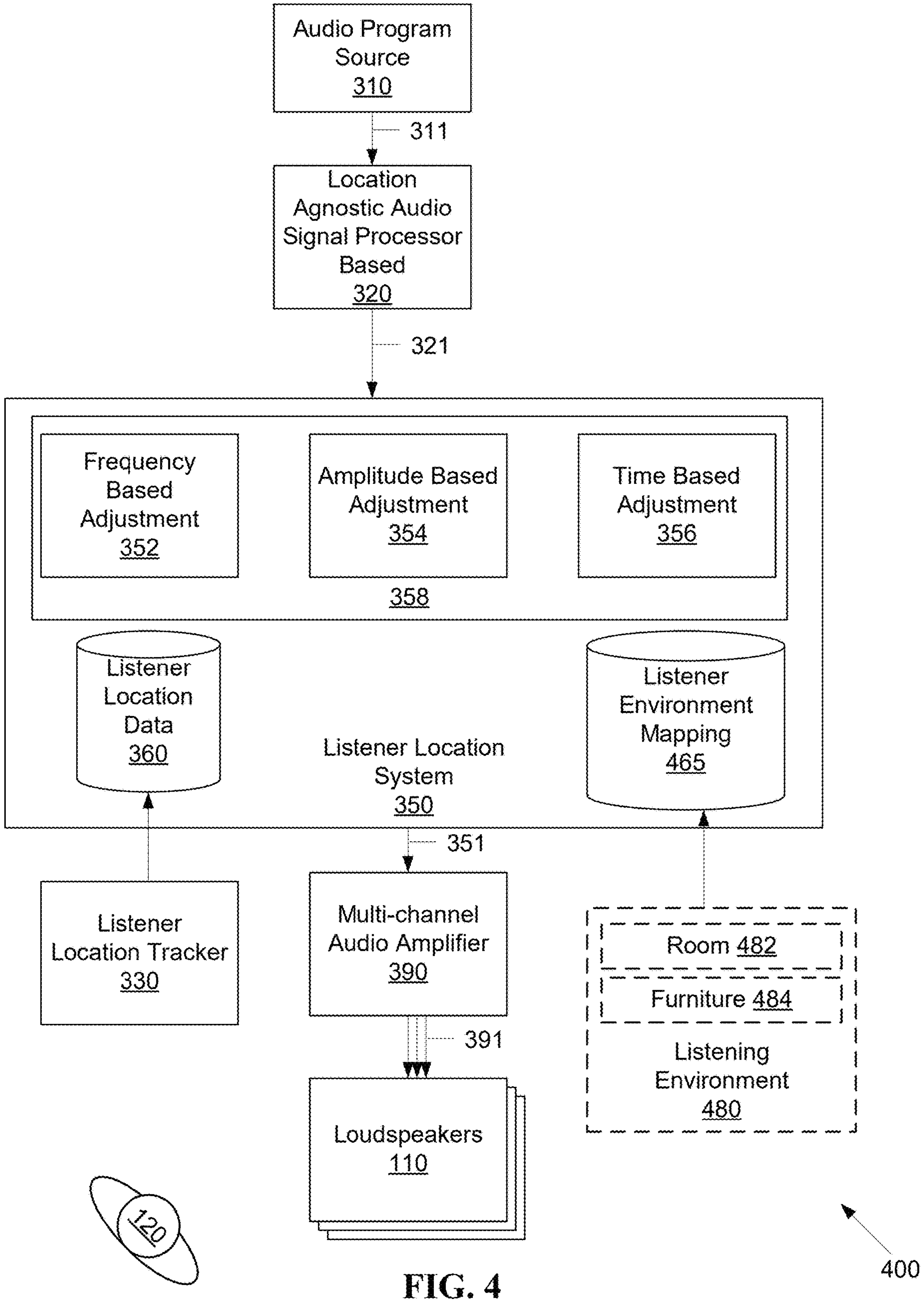
FIG. 4 is schematic block diagram of a second embodiment system for adjusting loudspeaker performance based on user location.

FIG. 4 shows a second embodiment system 400 for adjusting performance of a plurality of loudspeakers based on location of a listener. The elements of FIG. 4 having the same element number designations from FIG. 3 are substantially as described above with regard to the first embodiment.

To further compensate for listening angle on the spectral aspects of the audio performance, parametric equalization, or other means of magnitude response compensation, may be applied in accordance with the acoustic frequency response deviations at the listening location relative to each loudspeaker's acoustic response on-its primary (or optimal) listening axis. The corrective filter may be derived from the ratio of on-axis response to the in-room (listener location dependent) response which may be either known a priori or else acquired over the course of a semi automated set-up procedure involving pink noise or swept sine stimuli so as to determine each loudspeaker's family of acoustic response curves in the median plane over a range of radiation axes via an appropriate FFT (Fast Fourier Transform) process or an RTA (real time analyzer) application which is common to many smartphones.

The listener location based signal processor 358 may incorporate resulting listener environment mapping 465 data when performing location based audio adjustments. The listener environment mapping may be used to compensate for features in the listening environment 480, for example, reflections or absorption caused by features of the room 482 (wall/ceiling positions and material properties) and furniture 484.

Alternatively (or in addition) the listener location based signal processor 358 may incorporate data for estimating a loudspeaker's response variations on the basis of its transducer configuration and crossover frequencies. For example, conventional 25 mm dome tweeters typically would require substantial boost above 10 kHz along radiation axes progressively further from on-axis.

The first and second embodiments described above (and variations thereto) may include self-powered loudspeakers, at least one of which hosts substantial DSP (digital signal processing) capability, where both loudspeakers include a means of transmitting/receiving location and processing signals, for example, via Bluetooth Low Energy (BLE) or via cameras or thermal IR sensors, among others. Alternatively, the listener location system 350 may include digital signal processors that reside in a dedicated electronics component which communicates wirelessly with the loudspeakers.

Figure 6:
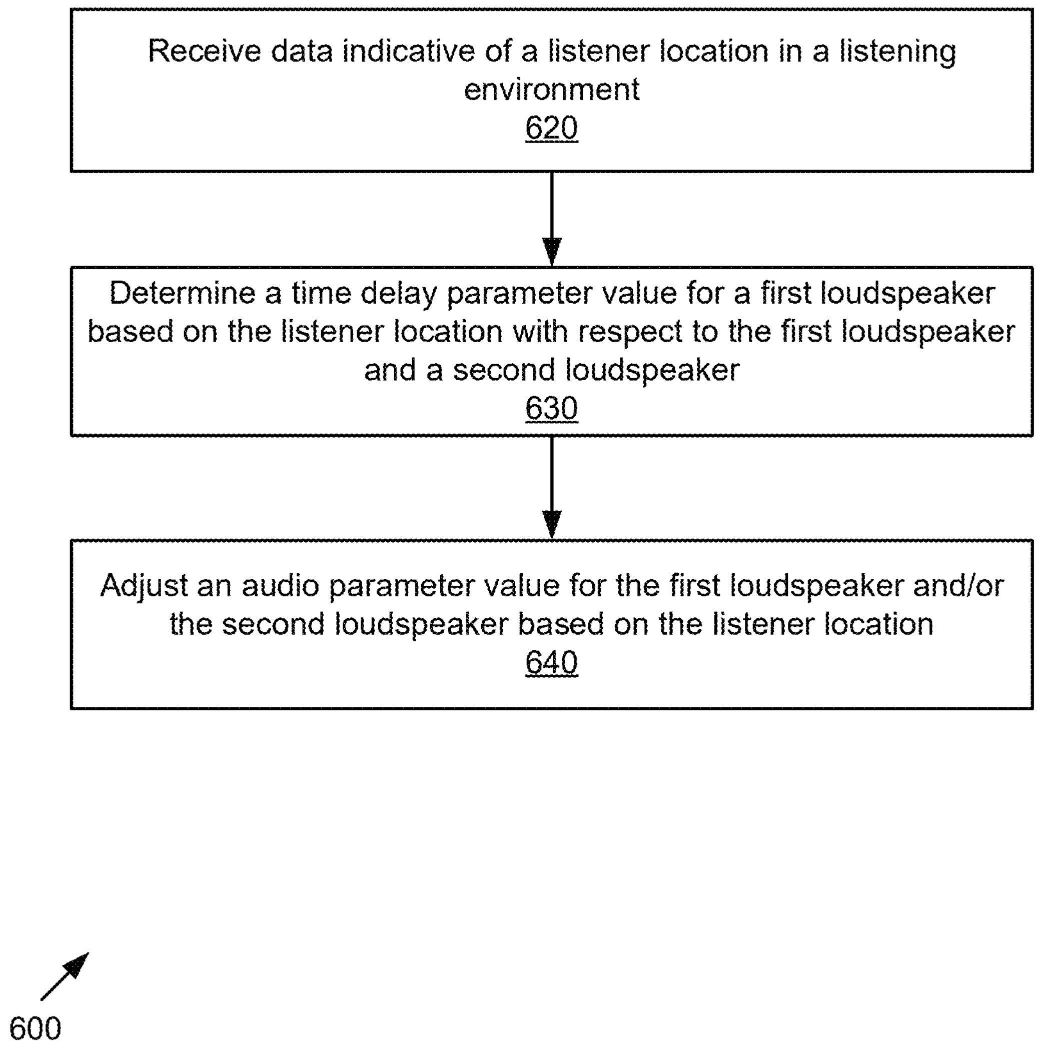
FIG. 6 is a flowchart of an exemplary method embodiment for adjusting loudspeaker performance based on listener location.

FIG. 6 is a flowchart of an exemplary method 600 for adjusting loudspeaker performance based on listener location. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A coordinate plane may be established for each pair of loudspeakers in the system in which speaker A is the origin $[(x_A,y_A)=(0,0)]$ and the location of speaker B is $(x_B, y_B)$. Note that $(x_L, y_L)$ designate the x and y-coordinates of location L (listener). AL may be computed using the distance formula:

$$AL=(x_L^2+y_L^2)^{0.5} \quad \text{(Eq. 5)}$$

Similarly, $$BL=[(x_L-x_B)^2+(y_L-y_B)^2]^{0.5} \quad \text{(Eq. 6).}$$

The acoustic response of each loudspeaker may be measured from the sweet spot S (FIG. 2), for example, using a sine-sweep or pink noise stimuli with conventional processing techniques.

Data indicative of a location L of the listener 120 is received, as shown by block 620. A time delay parameter value for the first loudspeaker 110L based on the listener location with respect to the first loudspeaker 110L and the second loudspeaker 110R is determined, as shown by block 630. The time delay provides distance correction based on the listener location L relative to the speakers. The time delay may be implemented on the more proximate loudspeaker in accordance with the Eq. 1 (above). An audio parameter value is adjusted for the first loudspeaker and/or the second loudspeaker based on the listener location, as shown by block 640. Eq. 3 may be used to achieve level balancing between the speakers (such that the listener perceives substantially equal sound levels from each speaker). Here, the more proximate speaker may be attenuated by 0.5*deltaSPL, while positive gain equal to 0.5*deltaSPL may be applied to the speaker more distant relative to the listening location. Similarly, an overall level correction may be applied to both speakers of a stereo pair so as to maintain the SPL that would be expected at the sweet spot for the current volume setting. With severe attenuation of the proximate speaker, the SPL experienced at the actual listening location may be lower than preferred which may warrant a global volume correction.

Other audio parameter value adjustments may also be performed. Frequency response correction (FRC, also referred to as frequency response compensation) may be desired when the actual listening axis deviates significantly from the preferred one. Such magnitude response corrections shall be made in accordance with the ratio of on-axis response to the actual response at the listening location.

FRC may be accomplished if, for example, a priori, the polar response in the horizontal plane is known and recorded. Interpolation between the captured response measurements at discrete radiation axes (for example, but not limited to +/−75 degrees at 5-degree increments) may be performed when the listener is located between the acquired response curves. This family of magnitude response measurements, or more precisely the family of transfer function ratios derived from on-axis to off-axis magnitude response, may reside in the system memory, or alternatively "in the cloud" for access as needed when a listening session commences. While interpolation is possible, preferably the correction curve associated with the smaller off-axis angle when between two acquired response curves for a more moderate magnitude correction is chosen. For example, if the listener is 23degs off axis, preferably the correction curve associated with 20degs shall be applied.

Figure 7A:
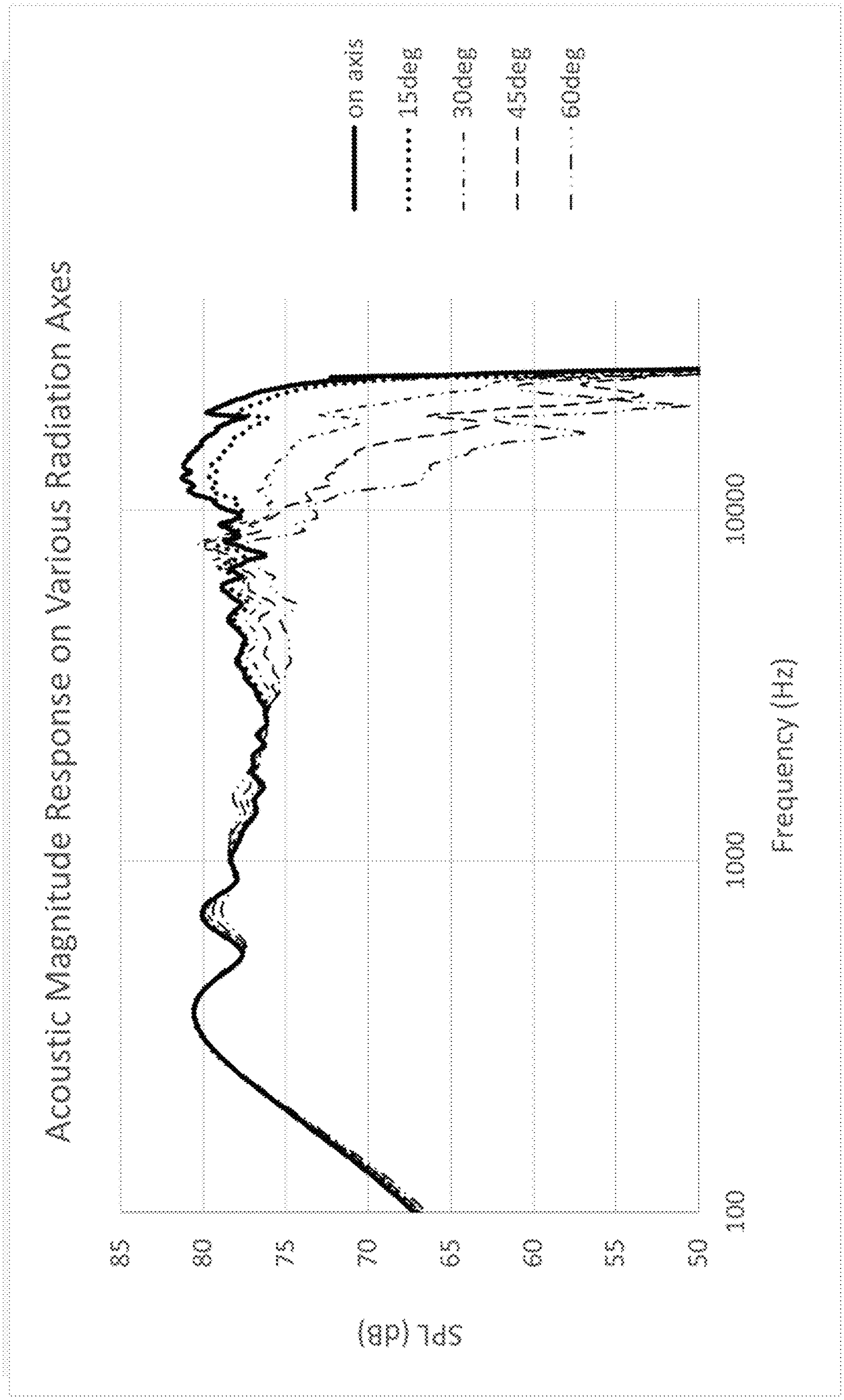
FIGS. 7A and 7B are plots that illustrate an exemplary derived correction curve for an off-axis listening location.
Figure 7B:
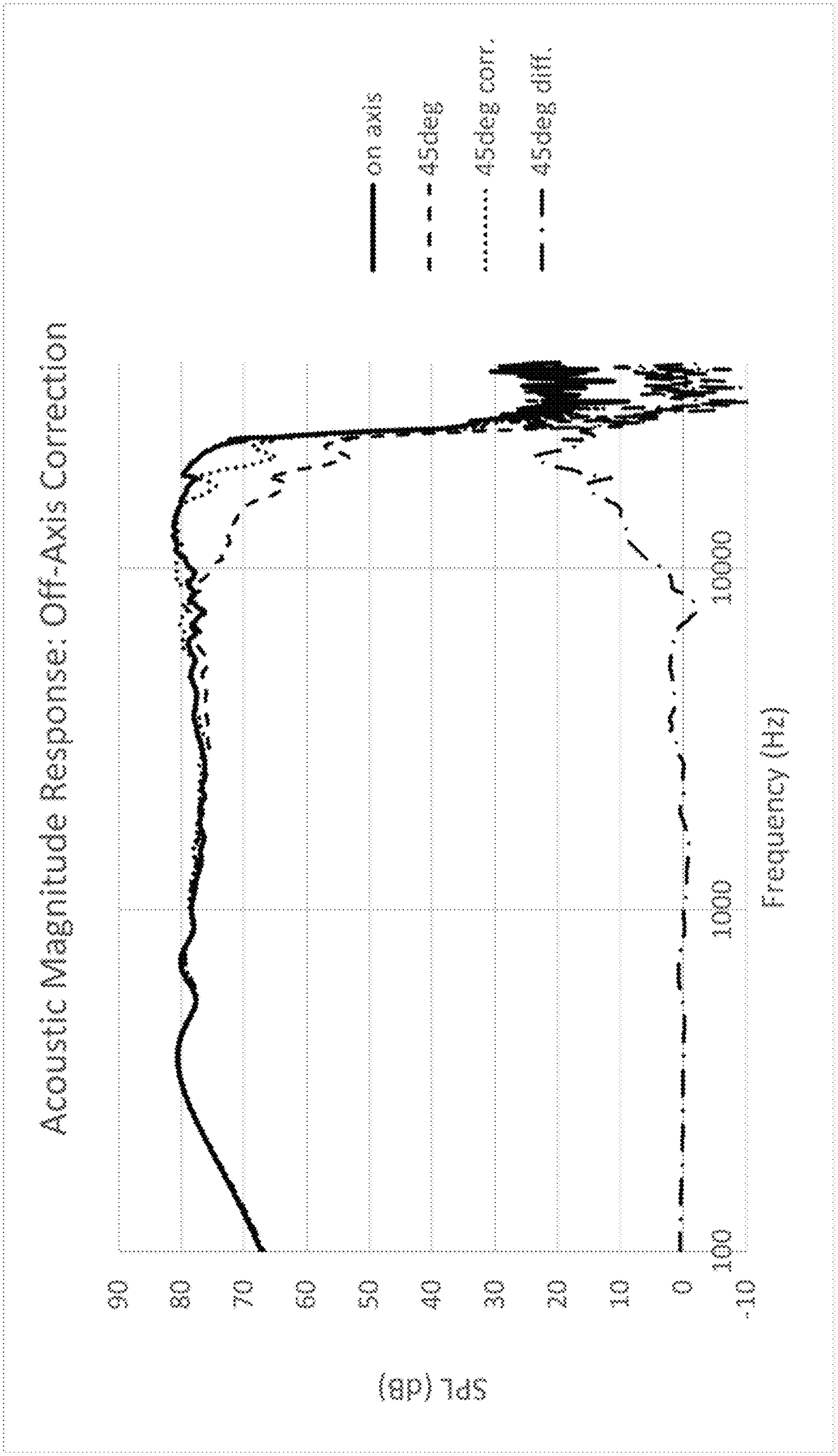

The compensation curves for off axis listening may be substantially limited in magnitude, for example to no more than +9 dB so as to prevent any gross deviations in acoustic response for a listener significantly displaced from the sweet spot. FIGS. 7A and 7B illustrate an exemplary derived correction curve for an off-axis listening location.

FIG. 7A shows a family of acoustic magnitude response curves for a conventional, 2-way electrodynamic loudspeaker over a wide range of measurement axes in the horizontal plane. FIG. 7A shows measurement axes on-axis (0 degree off-axis) through 60 degrees off-axis horizontally in 15 degree increments. The vertical measurement axis coincides with tweeter height for all of the response curves shown in the drawing.

FIG. 7B shows the mathematically derived difference curve between on-axis and 45 degrees off-axis. As expected, the magnitude response differences are quite small over the frequency band in which the speaker is relatively non-directional. The relatively small magnitude deviation of the 45deg off-axis response relative to on-axis up to ~8 kHz suggests a fairly broad radiation pattern up to that frequency, above which it naturally increases with frequency as acoustic wavelengths become increasing small compared to the speaker's high-frequency transducer (tweeter). Applying magnitude compensation (EQ) in accordance with the difference curve, the "corrected" 45deg off-axis magnitude response curve closely matches the on-axis curve. Note that in this example, a theoretical magnitude correction that approaches 12 dB at 15 kHz has been applied. However, in practice the correction magnitude may preferably be limited to 6-9 dB to ensure that the demands on the power amplifier and transducers are reasonable, as excessive gain would reduce the available amplifier headroom and thereby impose limits on dynamic range. Furthermore, excessive response correction may deleteriously affect the acoustic response in listening locations removed from the targeted area.

Adjusting Speaker Parameters Based on the Positions of a Plurality of Listeners

Audio/visual (AV) multi-channel solutions are often 'optimal' for one position in a room (the "sweet spot"), with other people in different room locations enjoying a lesser experience. Therefore, under an exemplary third embodiment, the audio system targets each individual person who is watching/listening to a TV or film, thereby providing an improved listening experience for everyone in the same room, no matter where they are located. Aspects of this system include the ability to identify/target user positions within a room (e.g., through multi-positional beam steering), and the ability to mitigate audio from other target positions so that it does not 'bleed' into other target positions.

There is generally a "sweet spot" or primary listening position in any room where others in the room are not afforded the same audio experience. By identifying how many listening positions are active and where those people are located, the system adjusts the audio to provide the improved audio to everyone in the room. The system may employ one of several means, for example, a camera, computer vision, Xbox Kinect type of technology, or a BLE (Bluetooth) pin worn by a listener, a remote control with BLE capability, or the like to direct the sweet spot. Additionally, as detailed herein, the primary listener may be prompted to emit aural cues, such as speaking or clapping, as a means of locating the sweet spot of a speaker system that includes microphones (singly and/or arrays) embedded in the loudspeakers. (see U.S. Pat. No. 8,194,874 B2 "In-room acoustic magnitude response smoothing via summation of correction signals") and frequency domain (U.S. Pat. No. 8,363,853B2 Room acoustic response modeling and equalization with linear predictive coding and parametric filters) based. By extension to 5.1 or larger home theatre systems, individual speakers may be addressed separately for optimal time and frequency domain performance. A method for establishing DSP settings associated with optimal performance at a single or multiple locations may involve sine sweep, MLS, or other types of stimuli.

The third embodiment provides a satisfactory audio experience to multiple persons in a listening environment by determining a "center of gravity" for a listening group; note that the system can optimize for CoG. For example, a non-weighted center of gravity CoG (x,y) for n listeners provides a substantially comparable listening experience for each listener:

$$CoG_x=(x_1+x_2+\ldots+x_n)/n \quad \text{(Eq. 7)}$$

$$CoG_y=(y_1+y_2+\ldots+y_n)/n \quad \text{(Eq. 8)}$$

where x and y represent the two dimensional rectangular coordinates in a plane of the listening space with respect to the position of a pair of loudspeakers.

Alternatively, a weighted center of gravity CoG (x,y) for n listeners includes weights $a_1, a_2, \ldots a_n$, may be determined by $$CoG_x=(a_1{*}x_1+a_2{*}x_2+\ldots+a_n{*}x_n)/(a_1+a_2+\ldots a_n) \quad \text{(Eq. 9)}$$

$$CoG_y=(a_1{*}y_1+a_2{*}y_2+\ldots+a_n{*}y_n)/(a_1+a_2+\ldots a_n) \quad \text{(Eq. 10)}$$

where the weighted center of gravity prioritizes the location of listeners with a larger weight. In practice, it may be sufficient and preferable to allow very limited weighting assignments. For example, the location of a primary listener may be weighted as 5, the location of a secondary listener may be weighted as 3, and all others 1, or perhaps 0 (zero).

Preferably, under the third embodiment the location within the listening environment of individual listeners is identifiable and tracked within the predetermined limits of the x,y plane, for example, by a LIDAR, camera with facial recognition, amongst other means. For example, single listener location data using the BLE method may not be sufficient for computing CoG data.

Additional considerations with regard to optimization on the basis of listening location apply to 5.1 (and other non-2ch-stereo) setups, for example, as shown by FIG. 8. The optimization procedure described herein may be applied towards each pair of loudspeakers. For the 5.1.0 setup shown in FIG. 8, both the Front L/R speakers 831, 832 and the rear Surround L/R speakers 841, 842 may be optimized for the listener's location or the listening CoG when multiple listeners are present in the listening environment 800 and they may be located by some means. Furthermore, the center channel speaker 810 may be optimized by compensating for off-axis listening and its distance relative to the Front L/R speakers.

The response compensation for off-axis listening involves determining a radiation axis of the listener (or listening CoG) for each speaker. This includes determining a listening angle θi with respect to each speaker Si where i=1, 2, 3 . . . n, which may be expressed in terms of the x,y coordinates of the listener L ($x_L$,$y_L$) and the speaker Si (xi,yi). Then, with reference to FIG. 9A, the trigonometric formula $$\arcsin(\theta i)=\text{abs}(x_L-xi)/\text{dLSi} \quad \text{(Eq. 11)}$$

in which dLSi is the distance between the listener (or CoG) and the loudspeaker i (S3 for example, when i=3) may used to compute angle θi. The distance dLSi, in terms of the x,y coordinates of the listener L (or CoG) and loudspeaker I may be expressed as $$\text{dLSi}=[(xL-xSi)^2+(yL-ySi)^2]^{1/2} \quad \text{(Eq. 12).}$$

Each angle θi is computed using Eq. 14 (see below) and may be rounded downward to the nearest 5-degree increment. For example, if Si is computed to be 19 degrees, the off-axis response compensation curve associated with 15 degrees, as opposed to 20 degrees may be applied.

Figure 9A:
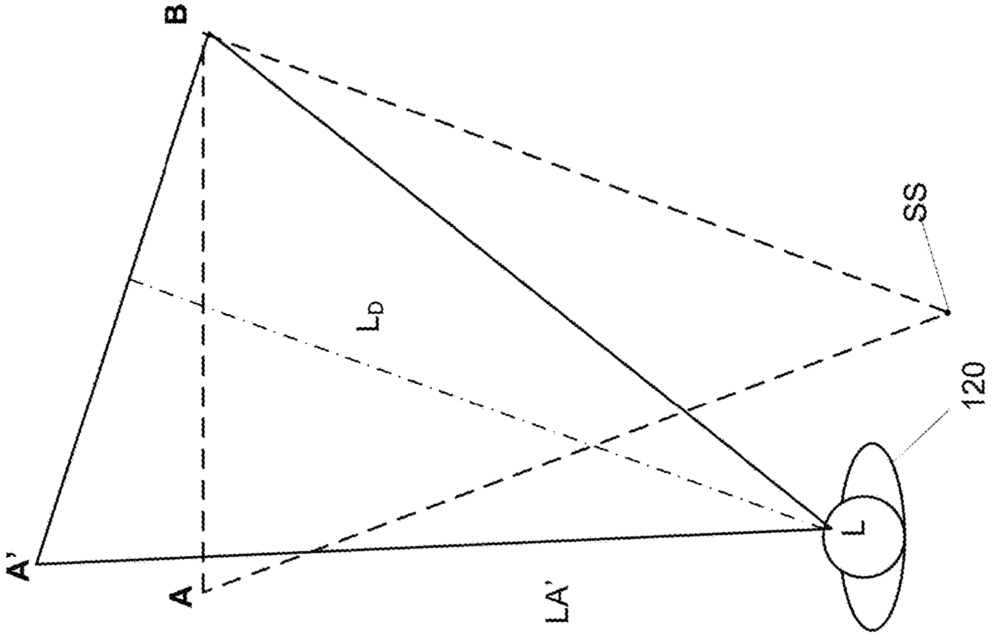
FIG. 9A is a schematic diagram of the audio system of FIG. 1 showing a virtual speaker location for a listener not situated at the sweet spot.

The loudspeakers may be pre-characterized with reference to the family of magnitude response curves in the horizontal plane, as shown in FIG. 7A. The response compensation curves may be derived by subtracting each off-axis curve from the on-axis reference response curve. For example, when the listener location with respect to Speaker 2 (S2), in this case the center channel with reference to FIG. 9A, is 47 degrees (03=47 degrees), the frequency dependent compensation curve $SPL_{comp}(f)=SPL_{on\text{-}axis}(f)-SPL_{45deg}(f)$. From FIG. 7B, the compensation curve varies in magnitude from 0 dB up to 12 dB over a range of 8-16 kHz.

Center Channel Synch

Figure 9B:
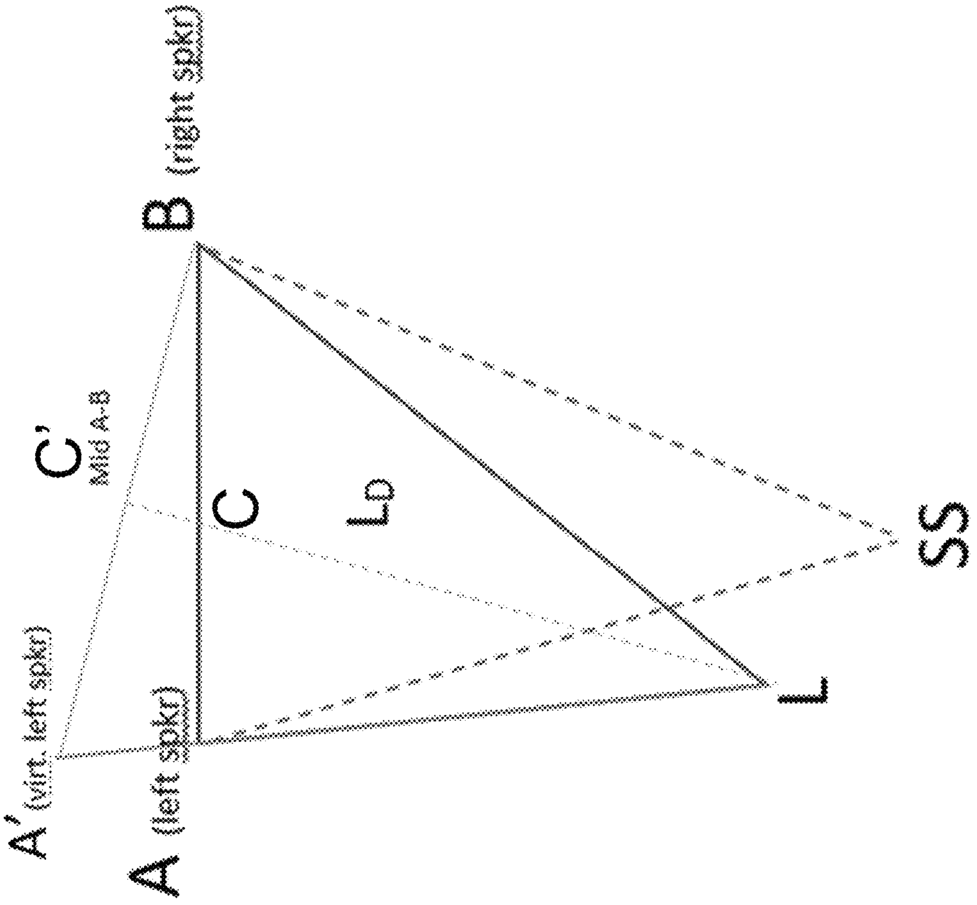
FIG. 9B is a schematic diagram of the audio system of FIG. 9A indicating a center speaker location.

For listening locations significantly removed from the sweet spot SS, for which conditions compensatory time delay is applied to the more proximate loudspeaker of a front stereo pair, also applying an appropriate delay to the center channel loudspeaker, if present, effectively shifts its apparent (perceived) location to a more favorable one such that the (psycho-acoustically) perceived locations of the three front loudspeakers (Left, Center and Right) are equidistant from the listener. With reference to FIG. 9B, a delay Tc shall be applied to the center channel to compensate for off-axis listening location L. Here, Tc is the difference between LC' and LC (expressed in meters) divided by the speed of sound under normal, indoor conditions (c=343 m/s). That is, $$Tc=1000*(LC'-LC)/343 \quad \text{(Eq. 13)}$$

when expressed in milliseconds. Note that this assumes that the center channel's actual location is placed substantially mid-way between the stereo pair of speakers A and B. If the center channel is not placed midway between the stereo pair, a further corrective delay may be applied.

Computation of LC' depends on LC which itself can be determined in a variety of methods as described elsewhere in this application. These methods may rely on Bluetooth transceivers, microphone embedded loudspeakers, LIDAR and/or cameras for locating each speaker within the sound system, assumed to be in fixed locations during a listening session, and the listeners whose locations (indicated by their x,y coordinates) may change. Once the two-dimensional spatial (x,y) coordinates of the listeners and the speakers are known, then not only are distances LA, LC, and LB determinable via computation but so too are the angles associated with the LAB and LAC listening triangles. These angles permit computation of LC' and hence the center channel time delay Tc. Referring again to FIG. 4 and with use of the trigonometric identity Law of Cosines, $$AB^2=LA^2+LB^2-2*LA*LB*\cos ALB, \quad \text{(Eq. 14)}$$

and solving for ALB yields $$ALB=\cos^{-1}[(LA^2+LB^2-AB^2)/(2*LA*LB)] \quad \text{(Eq. 15)}$$

Since LC bisects AB, angle ALC=ALC'=0.5*ALB. Given that cos C'LB=LC'/LB, LC' may be determined by: LC'=LB*cos C'LB=LB*cos CLB. The time delay associated with LC' and LC, or CC' may be applied to the center channel in order to "relocate" it to its optimal virtual location. From the speed of sound c, approximately 343 m/s under normal indoor conditions, and the difference between the center channel's actual and optimal virtual distance from the listener:

$$Tc=[(LB*\cos CLB-LC)/343]*1000. \quad \text{(Eq. 16)}$$

Loudness Compensation Based on Detected User Location

Figure 10:
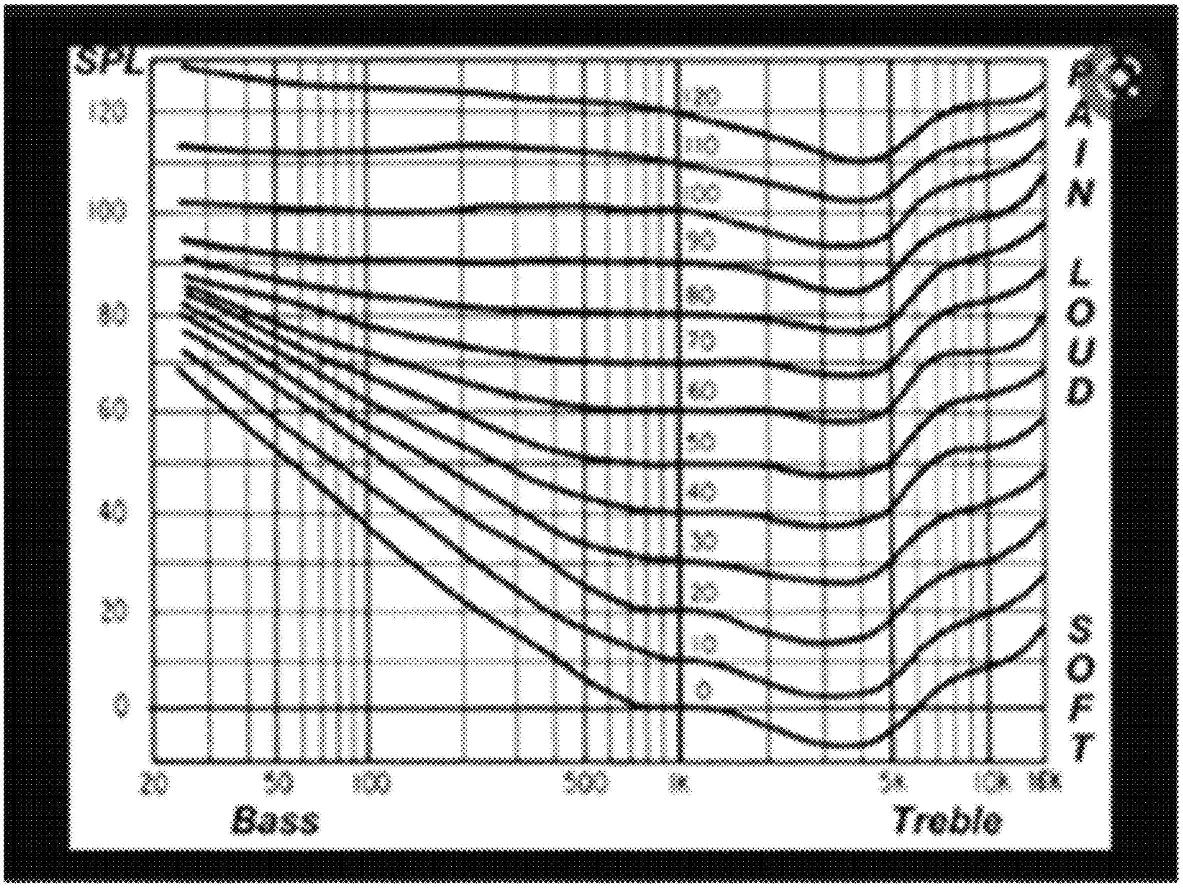
FIG. 10 (Prior Art)
FIG. 10 is a plot diagram showing a family of equal loudness response curves.

As used within this disclosure, "Loudness compensation" refers to magnitude response correction for addressing humans' relative insensitivity to low frequencies at lower sound levels in accordance with "equal loudness" or the well-known Fletcher-Munson curves shown in FIG. 10. ISO (International Organization for Standardization) 226-2003 has largely superseded the Fletcher Munson equal loudness curves but both are considered to be valid, and either/both are applicable for this embodiment. In layperson's terms, relative to higher frequency content (for example, above 400 Hz), a listener perceives less bass content (for example, below 400 Hz) of an audio program reproduced at a lower volume level than the bass content of that same musical program reproduced at a higher volume level. The "loudness" feature of some audio rendering equipment is intended to compensate for this perception by boosting the amplitude of bass content for lower volume levels. Since the perceived loudness of an audio program is also a function of distance between the listener and the loudspeaker as well as certain attributes of the acoustic environment such as reflectivity of boundary surfaces (walls, ceiling, and the floor) which can lead to "room gain" in the bass region, the desired effect of loudness compensation generally depends in part on the location of listener with respect to the loudspeakers. Therefore, it may be advantageous to adjust the parameters of a loudness compensation feature according to the position of the listener with respect to the loudspeakers.

Within the context of a fully active loudspeaker system, the signal processing chain and program content may be fully characterized; that all system settings such as master volume, channel levels (e.g., center channel set to +1.5 dB) and sound modes settings are known and the program content may be monitored for time-averaged levels, a reasonable estimation of overall SPL at the listening location is possible even if the in-room sound pressure level or acoustic response is not acquired. Program content may be monitored for level on a time-averaged basis, preferably with a long time constant, determining its value in terms of "dBFS" (e.g. −32 dbFS") or decibels relative to 0 dB Full-Scale.

As described herein, there are several means for determining the listening location relative to the loudspeakers. Once the listener's x,y coordinates have been determined, the distance and associated listening axis between the listener and each loudspeaker may be computed, and further, the expected sound pressure level at the listener location as a function of both the source material's native level and system settings, in addition to other factors such as the loudspeaker's proximity to boundaries (floor and walls), may be estimated. Some of the independent variables in this scenario include, but are not limited to, such known quantities as loudspeaker sensitivity (e.g., 87 dB SPL@1 m, 2.0V drive level), master volume (e.g. −24 dB), and channel gain (e.g., center channel gain=1.5 dB, surround channel gain=+3.0 dB, etc.). Based on a computation which encompasses some or all of these factors, the expected SPL within the 1 kHz octave band may be estimated. That SPL, for example 72 dB, may be used to determine the appropriate loudness compensation for the system substantially in accordance with the "equal loudness" family of response curves shown in FIG. 10 or with other compensation curves (e.g., a family of bass shelf filters) that the designer may choose. In this example, the low-frequency portion of Fletcher-Munson based loudness compensation curve associated with 70 dB (1.0 kHz level) consists of approximately 4 dB of gain per octave below 400 Hz (~+8 dB at 100 Hz and ~+12 dB at 50 Hz). The mid to high frequency portion consists of a shallow notch centered at ~3.5 kHz (−2 dB over a one-octave passband), above which there is substantial gain (~12 dB at 10 kHz). In practice, more moderate boost above 5 kHz (if any at all) and minimal mid-band cut may be found to be preferable subjectively compared to the reference (historical) equal loudness curves shown in FIG. 10.

Furthermore, the audio designer may choose to target more moderate magnitude compensation curves than the Fletcher-Munson or ISO 226 family of loudness compensation curves. In particular, relatively simple bass shelf filters whose gain varies inversely with signal levels have proven to be effective for loudness compensation. For the purposes of this document, it should be noted that dynamic response compensation, with a dependency on slow-averaged program material levels, system settings and the listener's location relative to the loudspeakers, should be generally or partially consistent with either FIG. 10 or with dynamic bass shelf filters. With regard to the latter, the system coefficients for the target magnitude response compensation curves may be generated. For example, a bass boost of approximately 6 dB (at 20 Hz) for a 70 dB SPL audio signal (within the 1.0 kHz octave band) may be expressed as the third order polynomial $$y=6\times10^{-9}x3+2\times10^{-5}x^2-0.019x+76.256 \quad \text{(Eq. 17)}$$

and similarly for larger or smaller targeted compensation curves for smaller or larger SPLs.

Computation of SPL at Listening Locations

In order to determine an appropriate loudness compensation response shaping from the family of Fletcher-Munson or ISO 226 curves, an estimate of the SPL experienced by the listener is required. The SPL estimate involves several different variables associated with the loudspeakers, and the listener's location along with a number of system parameters. With respect to the loudspeakers themselves, their reference sensitivity value, designated as SPLref, is a measure of SPL at a given distance and drive level. The location of the listener relative to the loudspeakers governs in part the sound levels perceived by the listener. As discussed herein, SPL falls at rate of 6.0 dB per doubling of distance and so it is possible to estimate SPL for a single loudspeaker at a given (known) distance when both SPLref and drive level are also known. The total SPL associated with multiple loudspeakers may be determined by the sound pressure of the loudspeakers assuming summation and inter-channel incoherence. Other variables of interest may include system settings such as master volume and channel gain, or alternatively, the loudspeaker's effective drive level in terms of root-mean-square voltage (Vrms) across its transducer's input terminals. The following is an exemplary algorithm for estimating the SPL experienced by a listener.

First, the SPL for each individual speaker in the system is estimated. Reference sensitivity, SPLref, is a measure of the expected sound pressure level at 1 m when driven by a voltage associated with 1.0 W. For a 4 ohm system, 2.0 Vrms yields 1.0 W. Typical SPLref values for 4.0 ohm electrodynamic loudspeakers are substantially within the 80-90 dB range (2.0 Vrms at 1.0 m). Next, the distance between each speaker and the listener is taken to account. In accordance with the known relationship between SPL and distance and using SPLref, a 6.0 dB reduction in SPL for every doubling of distance, the expected SPL at listening distance may be computed assuming for now that the drive power is 1.0 W. This formula appears herein and may be expressed as $$SPL(Lsi)=SPL\text{ref}-6.0*\log 2(Lsi) \quad \text{(Eq. 18)}$$

where Lsi is the distance between the listener L and each speaker Si (i=1, 2, 3, . . . n). Next, the volume "trim" associated with the speaker may be factored in. For example, center or surround speakers may be boosted or attenuated by 6 dB or more at the discretion of the user. Alternatively, the net drive level which encompasses a number of fixed and variable gain settings may be used. Additionally, the slow-time-averaged level of the program material itself is considered in terms of dBFS (full-scale). Finally, factoring in the relative amplitude adjustments for optimal channel balance at the listening location, as described herein, and the net system gain setting as it pertains to speaker drive voltage, a reflection of master volume and any gain adjustments within an active loudspeaker's resident DSP, each loudspeaker's expected contribution to the sound level experienced by the listener may be expressed as follows:

$$SPL_i=SPL\text{ref}_i+SPL(LSi)+[\text{prog.level(dBFS)}+Opt\_\text{Amplitude\_Adjustment}_i+\text{Net Sys.Gain}+Ch\ \text{Trim}_i] \quad \text{(Eq. 19).}$$

It should be noted that the four bracketed terms in Eq. 19 may be replaced by the slow time-averaged drive level, in Vrms, referenced to 2.0 Vrms (or as appropriate for the transducer of a given nominal impedance) in terms of dBV. From this equation, the rms (root mean square) sound pressure $p_i$ can be determined: $p_i$=10^[($SPL_i$/20)−4.7] Pascals. Next, the $p_i$ values are summed assuming relative inter-channel incoherency, and SPL may be determined from the formula $$SPL=20*\log 10(0.707*p/20*10^{-6})\text{dB} \quad \text{(Eq. 20)}$$

where p reflects the summation of the $p_i$ values.

Eq. 20 may be applied to a two-channel (stereo) configuration in which both loudspeakers present 4 ohm nominal loads to the drive amplifiers. For this example, their SPLref sensitivity values are 87.0 dB (2.0V at 1.0 m). Further, in this example, speakers A and B are respectively 2.30 and 3.36 m from the listener, net gain within the DSP, a reflection of master volume and channel gains, is set to −9.0 dB, the slow-averaged program level is −6.0 dBFS and the inter-channel trim adjustments are set to 0 dB. Using the formulas presented herein, the amplitude adjustments for optimal channel balance are +/−1.64 dB for speakers B (further from the listener) and A (more proximate). Using the Eq. 20 above, $SPL_A$=87.0−7.21−6.0−1.64−9.0+0.0=63.15 dB. Similarly, $SPL_B$=87.0−10.49−6.0+1.64−9.0+0.0=63.15 dB.

That $SPL_A$ and $SPL_B$ match should be expected since the appropriate amplitude compensation have been applied in order to achieve balanced levels at the listening location. Next, the rms pressure associated with $SPL_A$ and $SPL_B$ is computed. For both speakers A and B, the result is $p=2.87*10^{-2}$ Pa and, not surprisingly, the expected SPL at the listening location is 66.15 dB, 3.0 dB larger than each speaker individually in accordance with incoherent summation. Next, this level may be used to determine loudness compensation from the ISO 226 or Fletcher-Munson family of loudness compensation curves. Finally, it should be noted that the selected loudness compensation curve should be applied to all of the loudspeakers in the system, most especially the subwoofer (if present), even though the subwoofer is not considered when estimated the SPL perceived by the listener since, for purposes of selecting a loudness compensation curve, in general only SPL within the 1.0 kHz band (which the subwoofer does not contribute to) is of concern.

It should be noted that for alternative speaker configurations relative to the exemplary 2.0.0 one considered in detail herein, such as 3.0.0, 4.0.0, 5.1.0, 5.1.2 etc., the contribution of each "full-range" non-subwoofer loudspeaker shall be computed in accordance with the algorithm above, assuming non-coherent summation.

Figure 11:
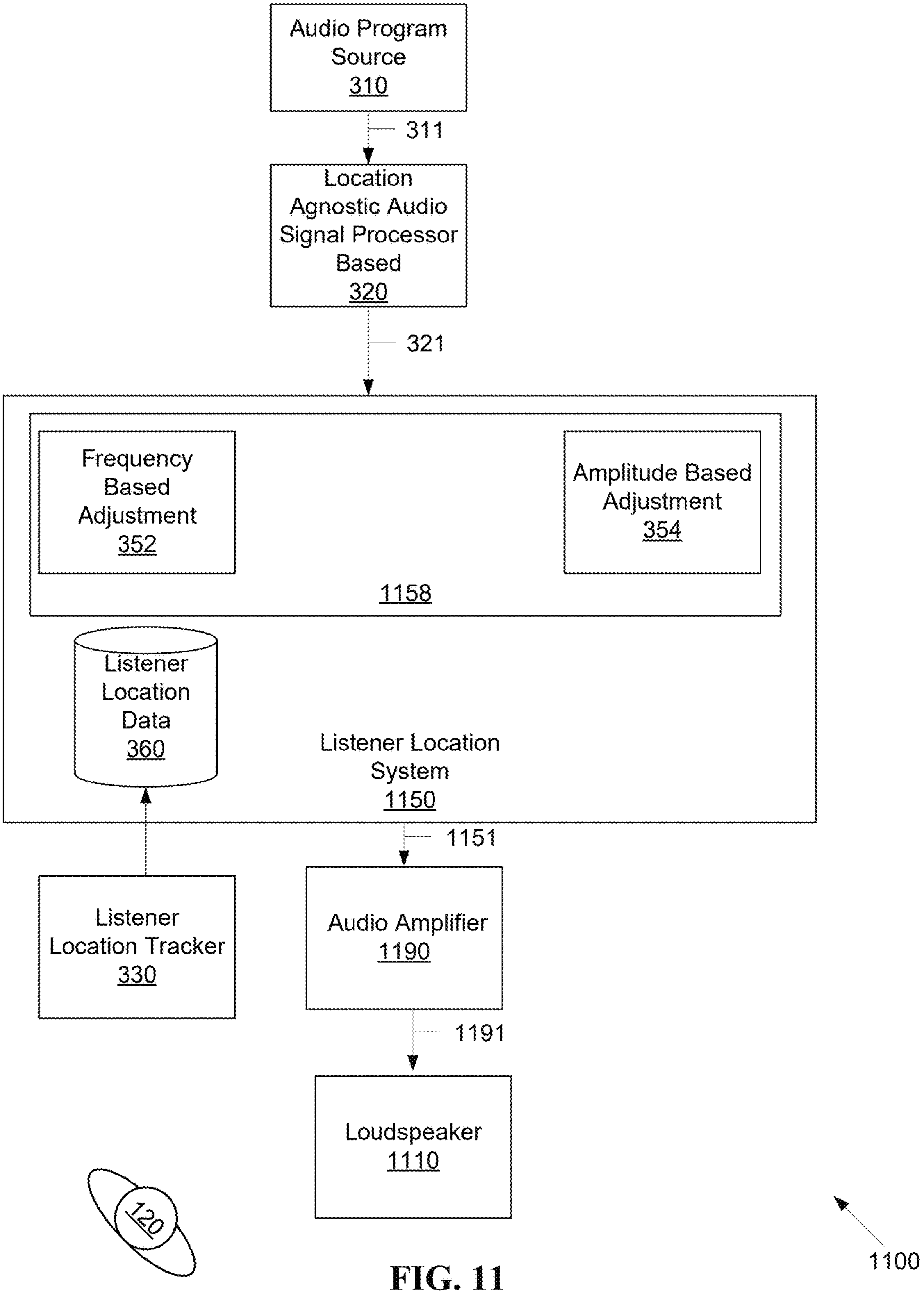
FIG. 11 is schematic block diagram of a second embodiment system for adjusting loudspeaker performance based on user location.

FIG. 11 shows a second embodiment system 1100 for adjusting performance of a loudspeaker 1110 based on location of a listener. The system 1100 has an audio program source 310, for example, an audio or audio/video streaming service, a television, a cable box, an optical disc player, and the like. The audio program source provides audio data 311 (for example, digital data or an analog signal) to an audio processor 320 configured to accept analog audio or digital audio, for example, an audio pre-amplifier providing traditional audio processing controls such as volume, equalization (bass/middle/treble), and the like. While conventional audio components, such as an audio/video receiver (AVR) do afford such processing controls, control settings are preferably to be set to "default" values under the present embodiments. The audio processor 320 may be generally unaware of the physical location of a listener of the system 1100 with respect to the loudspeakers 1100. The audio processor 320 may output an analog audio and/or a digital audio signal 321.

A listener location system 1150 receives the audio signal output 321 from the audio processor 320, and provides a modified audio signal 1151 to an audio amplifier 1190. The listener location system 1150 includes a listener location based signal processor 1158, and a listener location data store 360. The listener location based signal processor 1150 may include a frequency based adjustment module 352, and an amplitude based adjustment module 354, that may be as described in the first embodiment system 300. The listener data location store 360 contains listener location data indicating the location of a listener 120 with respect to the loudspeaker 1110. For this embodiment, the location may consist of a distance between the listener 120 and the loudspeaker. The listener data location store 360 receives listener location data from a listener location tracker 330, described previously.

Note that in accordance with the equal loudness curves (FIG. 10), both bass boost and treble boost may be adaptively applied. For example, when the SPL at the listening location has been determined to be 60 dB at 1 kHz (either by estimation or by actual measurements), a bass boost of approximately 18 dB at 50 Hz and a treble boost of 12 dB at 10 kHz with progressively more boost above that frequency may be applied in order to maintain a desirable spectral balance, assuming that the speaker's inherent magnitude is flat over its entire passband. At lower listening levels more boost and treble boost would be required, but as listening levels approach 90 dB at the listening location, no bass boost is needed.

Figure 12:
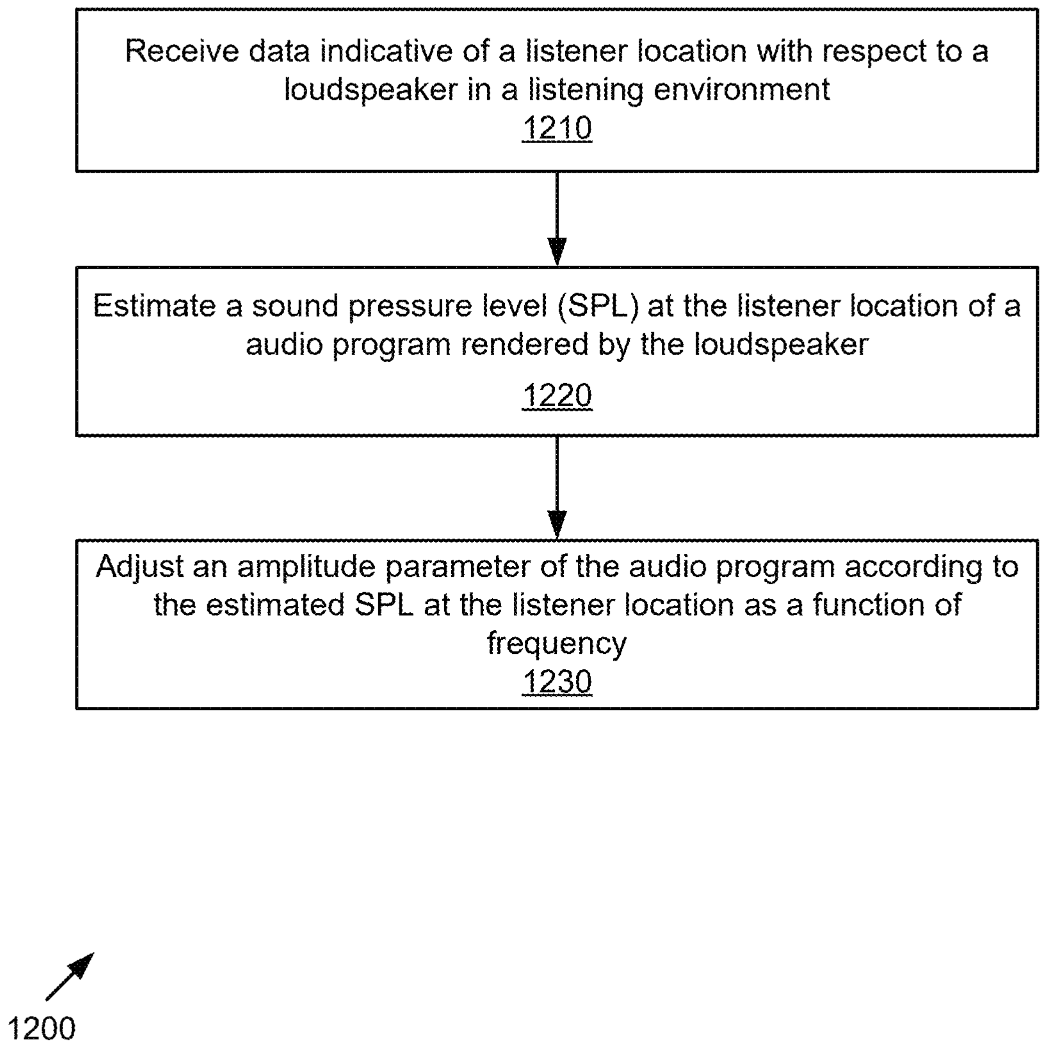
FIG. 12 is a flowchart of an exemplary method embodiment for adjusting loudspeaker loudness based on listener location.

FIG. 12 is a flowchart of an exemplary method embodiment for adjusting loudspeaker loudness based on listener location. Data indicative of the listener location with respect to the loudspeaker is received, as shown by block 1210. A sound pressure level (SPL) of the audio program rendered by the loudspeaker is estimated at the listener location, as shown by block 1220. An amplitude parameter of the audio program rendered by the loudspeaker is adjusted according to the estimated SPL at the listener location as a function of frequency, as shown by block 1230.

Compensation for Interaural Crosstalk Based on a Detected Listener Location

"SDA" (Stereo Dimensional Array), Polk Audio's proprietary interaural crosstalk cancellation (IACC) method, performs optimally when the listener occupies the traditional stereo sweet spot location between a pair of SDA enabled loudspeakers in accordance with FIG. 2, where the listening location L coincides with the sweet spot S. Off-axis locations suffer from sub-optimal SDA performance due to poor time alignment of the SDA cancellation signals arrival at the opposing (contralateral) ears with respect to the main stereo signals, as described by U.S. Pat. No. 10,327,064. Exemplary embodiments described herein disclose a method for compensating for an off-axis listener location applicable to SDA loudspeakers. The exemplary embodiments appropriately delay audio directed to one or more SDA loudspeakers more proximate to the listener than other SDA loudspeakers and adjusts relative levels so as to present a balanced stereo image. These two conditions—time-aligned and level-balanced loudspeakers as presented to the listener—are necessary for SDA technology to operate properly.

There are two SDA methodologies and the applicability of one or the other depends on the loudspeaker configuration. Acoustic SDA (aSDA) uses dedicated transducers for SDA effects. Their placement outboard of the "main signal" transducers by a distance substantially equal to the distance between an adult human's ears ensures that SDA effects from the Left and Right loudspeakers of a stereo pair reach the listener's contralateral (Right and Left) ears simultaneously (in time alignment), thereby providing the intended spatial widening effect. Electronic SDA (herein referred to as eSDA) is an alternative method of achieving spatial widening via IACC that is compatible with conventional loudspeaker configurations. eSDA, when applied to such loudspeaker configurations (for example, two-way designs comprised of a single tweeter (high-frequency transducer) and one or more mid-bass drivers), employs the speaker's primary mid-bass driver to serve two functions: to reproduce both the main stereo signal and the derived and delayed SDA effects. This method of SDA is incompatible with passive loudspeakers due to the need for active signal processing including phase inversion and magnitude shaping. Further, with regard to eSDA, in order to virtualize SDA effects from a single transducer, they must be delayed relative to the "main" stereo content such that their arrival at the listener's ears coincides with main stereo signals from the opposite side loudspeaker. That is, SDA effects from the Left speaker which substantially include attenuated, phase inverted R channel signals (and likewise for the Right speaker whose eSDA effects are substantially phase inverted, attenuated and bandpassed L channel) optimally arrive coincidentally at the Left ear as Right main stereo channel information so as to destructively interfere such contralateral signals, hence achieving IACC. U.S. Patent App. No. 63/305,555 (currently pending) describes a method for implementing eSDA. Further, U.S. Provisional Patent App. No. 63/305,555 covers both first and multiple order eSDA. The latter addresses unintended SDA effects reaching the listener's contralateral (opposite) ears, for example when minus L signals radiated by the Right speaker reach the listener's Left ear, by playing further delayed SDA effects. In this example, the Left Loudspeaker plays Left channel information with additional attenuation and twice the SDA delay.

Figure 9C:
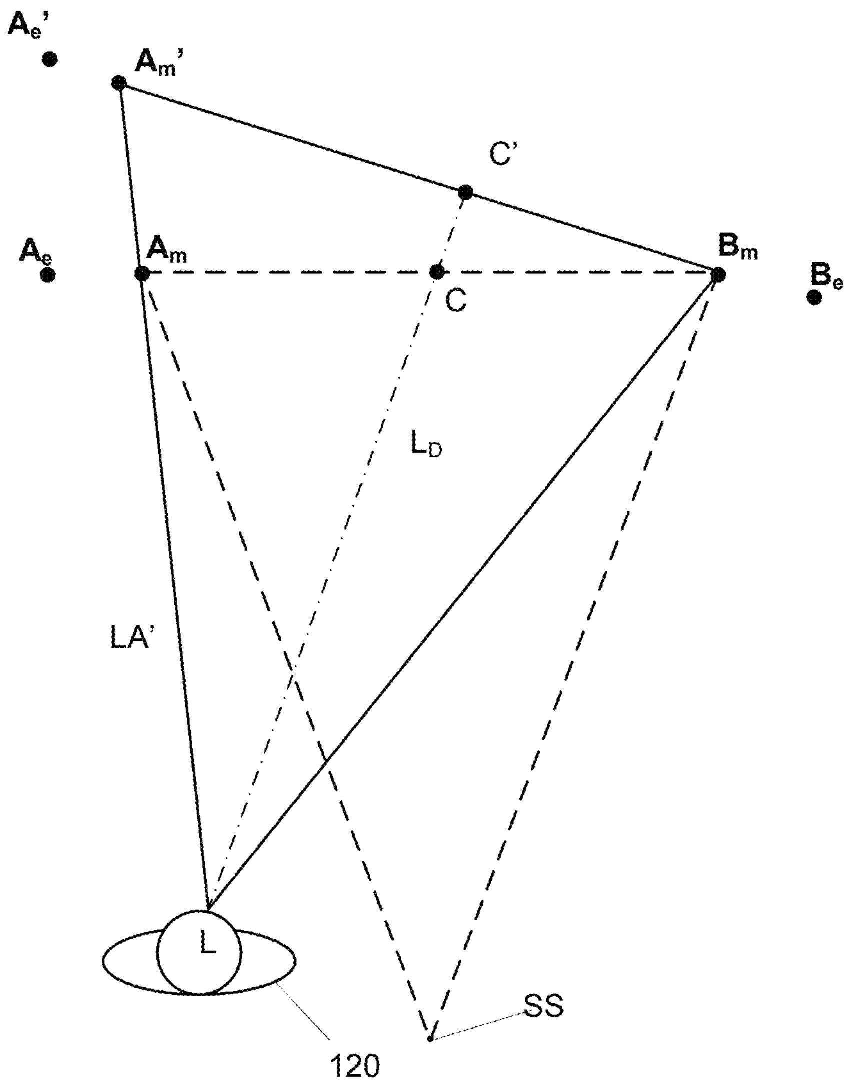
FIG. 9C is a schematic diagram of the audio system of FIG. 9A indicating locations calculated for smart SDA embodiments indicating locations of virtual sources for an adaptive interaural crosstalk cancellation embodiment.

Generally, the optimal delay parameters for eSDA vary with both listening distance and the stereo speaker's included angle, or their physical separation. With respect to the latter, eSDA delay depends in part on the included angle formed by a pair of loudspeakers and the listener vertex, such as (angle)/ALB in FIG. 9C. Based on the methods described herein, the loudspeaker and listener locations, expressed as their (x,y) Cartesian coordinates, are known or fully determinable. In terms of the known distance values of LA, LC, LB and the optimal virtual spacing of eSDA effects speakers relative to the "main" counterparts, optimal eSDA time delay may be computed. With reference to FIG. 9C which shows the locations of loudspeaker A and B's "main" stereo drivers ($A_m$ and $B_m$) and the locations of their virtual eSDA "effects" drivers $A_e$ and $B_e$, the optimal eSDA delay may be computed from $$\tau_{eSDA}=(LB_e-LB_m)/c \tag{Eq. 21}$$

where c is the speed of sound in air under normal indoor conditions (343 m/s). It should be noted that $\tau_{eSDA}$ generally depends on not only listening distance LC' but also on the included angle $/A_mLB_m$. Generally, as this angle increases with more physical separation between the speakers, the optimal eSDA delay $\tau_{eSDA}$ increases as well. Table 1 below indicates the values of $\tau_{eSDA}$ for a variety of listening distances and speaker angles. Based on the established locations of the speakers and the primary listener, $\tau_{eSDA}$ may be computed and applied to each speaker of the stereo pair in combination with the other compensatory adjustments described herein for relative speaker location including delay (for the more proximate speaker), magnitude (gain adjustments so as to achieve substantially equal SPL from each loudspeaker) at the listening location and response shaping for off-axis listening.

TABLE 1 optimal eSDA delay for a range of listening distances and speaker position angles

| Listening Distance C' (m) | 2.5 | 5.0 | 1.25 | 2.5 | 2.5 | 1.25 |
|---|---|---|---|---|---|---|
| Stereo Speaker Included Angle/_ALB (degrees) | 60 | 60 | 60 | 45 | 75 | 75 |
| eSDA delay (μ-sec) | 227 | 222 | 235 | 177 | 273 | 278 |

Figure 5:
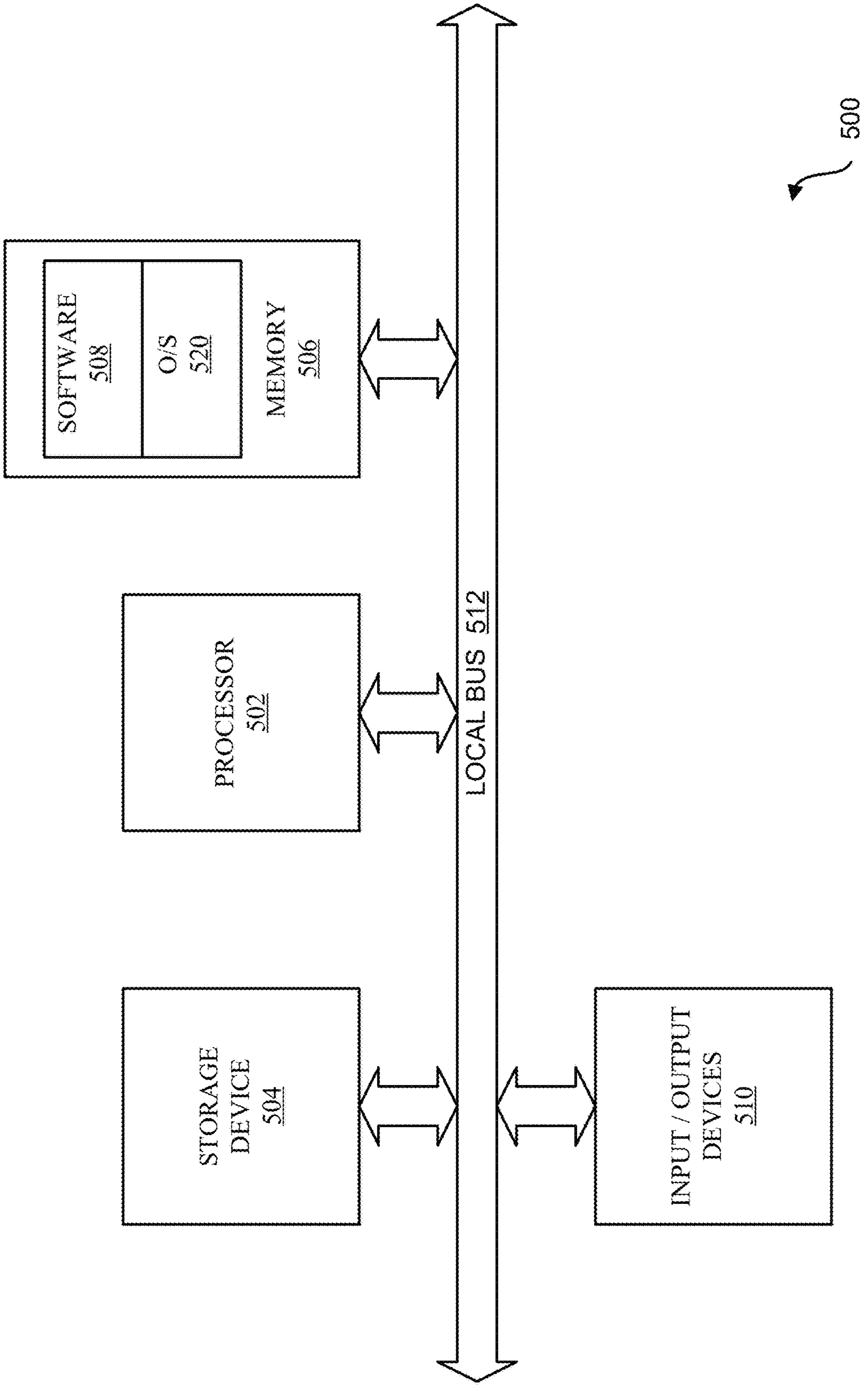
FIG. 5 is a schematic diagram illustrating an example of a system for executing functionality of the present invention.

The present system for executing the functionality of the listener location system 350 described in detail above may be a computer, an example of which is shown in the schematic diagram of FIG. 5. The system 500 contains a processor 502, a storage device 504, a memory 506 having software 508 stored therein that defines the abovementioned functionality, input, and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adjusting loudspeaker performance based on a location of two or more of a plurality of listeners of an audio system rendering a plurality of audio channels of an audio program within a listening environment, comprising the steps of:

receiving data indicative of a location of a first listener in the listening environment with respect to a first loudspeaker and a second loudspeaker;

receiving data indicative of a location of a second listener in the listening environment with respect to the first loudspeaker and the second loudspeaker;

determining a listener location center of gravity based on the location of the first and second listeners;

determining a time delay parameter value for the first loudspeaker based on the listener location center of gravity with respect to the first loudspeaker and a second loudspeaker; and adjusting an audio level parameter value for the first loudspeaker and/or the second loudspeaker based on the listener location center of gravity.

2. The method of claim 1, further comprising the steps of:

determining a first speaker first distance LA from the first listener location to the first loudspeaker and a second speaker second distance LB from the first listener location to the second loudspeaker.

3. The method of claim 2, wherein determining the time delay parameter value for the first loudspeaker is determined is based on LA and LB.

4. The method of claim 2, wherein determining the audio level parameter value for the first loudspeaker and/or the second loudspeaker is based on LA and LB.

5. The method of claim 2, further comprising the steps of:

receiving data indicative of a location of the first listener in the listening environment with respect to a third loudspeaker receiving a third audio channel and a fourth loudspeaker receiving a fourth audio channel;

determining a time delay parameter value for the third audio channel based on the first listener location with respect to the third loudspeaker and a fourth loudspeaker, adjusting an audio level parameter value for the third audio channel and/or the fourth audio channel based on the first listener location.

6. The method of claim 2, further comprising the steps of:

receiving data indicative of a location of the first listener in the listening environment with respect to a third loudspeaker receiving a third audio channel;

determining a time delay parameter value for the third audio channel based on the first listener location with respect to the first, second, and third loudspeakers, adjusting an audio level parameter value for the third audio channel based on the first listener location.

7. The method of claim 6, wherein the first loudspeaker comprises the left loudspeaker of a stereo pair, the second loudspeaker comprises a right loudspeaker of the stereo pair, and the third loudspeaker comprises a center speaker with respect to the stereo pair.

8. The method of claim 2, further comprising the steps of:

estimating a location of a third loudspeaker with respect to the first loudspeaker and the second loudspeaker; and determining a time delay parameter value for the third audio channel based on the first listener location with respect to the estimated third loudspeaker location.

9. The method of claim 1, further comprising the steps of:

assigning a priority between the first and second listeners; and adjusting the center of gravity according to the priority of the first and second listeners.

10. A method for determining a listener location with respect to a first loudspeaker comprising a first microphone at a first known location and a second loudspeaker comprising a second microphone at a second known location, the method comprising the steps of:

detecting by the first and second loudspeaker microphones a sound produced at the listener location;

determining a time differential between the first detecting and the second detecting; and determining the listener location relative to the first and second loudspeaker based on the time differential, wherein the sound is an asynchronous sound, and further comprising the step of estimating a time the asynchronous sound was produced.

11. The method of claim 10, wherein the sound is triggered by a device at the listener location, and further comprising the step of:

recording, by the device, a time the sound is emitted at the listener location.

* * * * *